(12) United States Patent  
Goldfine et al.

(10) Patent No.: US 12,332,201 B2  
(45) Date of Patent: Jun. 17, 2025

(54) SYSTEM AND METHOD FOR PIT DETECTION AND SIZING

(71) Applicant: JENTEK Sensors, Inc., Marlborough, MA (US)

(72) Inventors: Neil J. Goldfine, Cocoa Beach, FL (US); Andrew P. Washabaugh, Chula Vista, CA (US); Mark Windoloski, Chelmsford, MA (US)

(73) Assignee: JENTEK Sensors, Inc., Marlborough, MA (US)

( * ) Notice: Subject to any disclaimer, the term of this patent is extended or adjusted under 35 U.S.C. 154(b) by 407 days.

(21) Appl. No.: 17/662,634

(22) Filed: May 9, 2022

(65) Prior Publication Data

US 2022/0358630 A1 Nov. 10, 2022

Related U.S. Application Data

(60) Provisional application No. 63/185,421, filed on May 7, 2021.

(51) Int. Cl.
| | |
|---|---|
| *G01H 13/00* | (2006.01) |
| *G01B 11/12* | (2006.01) |
| *G01B 11/22* | (2006.01) |
| *G01N 27/02* | (2006.01) |
| *G01N 29/12* | (2006.01) |

(52) U.S. Cl.  
CPC .. *G01N 27/028* (2013.01); *G06T 2207/30136* (2013.01)

(58) Field of Classification Search  
CPC .................................................. G01N 27/028  
See application file for complete search history.

(56) References Cited

U.S. PATENT DOCUMENTS

| | | | | |
|---|---|---|---|---|
| 4,641,529 A | * | 2/1987 | Lorenzi | G01N 29/265 73/644 |
| 5,323,429 A | * | 6/1994 | Roarty | G21C 17/017 376/249 |
| 6,420,867 B1 | * | 7/2002 | Goldfine | G01N 27/9046 324/242 |
| 2005/0088172 A1 | * | 4/2005 | Goldfine | G01N 27/9046 324/242 |
| 2013/0206992 A1 | * | 8/2013 | Jin | G01B 11/12 250/353 |
| 2017/0328178 A1 | * | 11/2017 | Lucas | E21B 44/00 |
| 2021/0091442 A1 | * | 3/2021 | Uemichi | H01P 1/2088 |

* cited by examiner

*Primary Examiner* — Alesa Allgood  
(74) *Attorney, Agent, or Firm* — Zachary M. Thomas

(57) ABSTRACT

A system and method are disclosed for enhancing pit detection and sizing in a test object. Response signatures are created and stored in a signature library to characterize various sensor responses (liftoff, orientation) and pit properties (e.g., depth, width), possibly with or without additional considerations (e.g., edges, cracks). A sensor is placed on and scanned across a surface of interest on the test object. During scanning the sensor is measured repeatedly at regular intervals. An encoder may be used to record the sensor position for each measurement. The measurement results are then correlated with one or more signatures in the signature library. A threshold is used to determine if the correlation is indicative of the detection of a pit. If so additional processing may be performed to estimate pit properties.

20 Claims, 12 Drawing Sheets

SYSTEM AND METHOD FOR PIT DETECTION AND SIZING

RELATED APPLICATION

The present application claims priority under 35 U.S.C. § 119(e) to U.S. provisional patent application, U.S. Ser. No. 63/185,421, filed May 7, 2021 which is herein incorporated by reference in its entirety.

GOVERNMENT SUPPORT

The invention was supported, in whole or in part, under contract N68335-18-C-0200, from the U.S. Navy. The Government has certain rights in the invention.

TECHNICAL FIELD

The present disclosure relates to the field of non-destructive evaluation (NDE).

BACKGROUND

NDE can be used to evaluate the condition of materials at and during production, prior to deployment, periodically during deployment, and after deployment. NDE for corrosion pits is needed in a wide array of applications including: aircraft skins, bolt holes in aircraft, turbine blades, gun barrels, piping and pipelines, bridges, and other high value assets. Often it is desired to inspect through paint, coatings/insulation or under challenging surface conditions. The most common method for detection of early stage surface corrosion and corrosion pitting is visual inspection which requires removal of paint or other outer layers that prevent reliable visual inspection. Several methods have been attempted over the last few decades for detection of early stage corrosion and pitting without requiring substantial surface preparation, these have included conventional eddy current testing and eddy current arrays, microwave based methods, thermography, and ultrasonic testing. However, no widely used method has advanced, leaving visual inspection as the most widely used method. Furthermore, even when visual inspection can detect the presence of early corrosion or corrosion pitting, the remediation actions are left without knowledge of severity or depth of corrosion. The result is that remediation actions such as grinding and blending to remove corrosion are often left "chasing" the corrosion deeper and deeper into the part, revealing cavities of corrosion product below the original surface. This results in high costs that could be avoided if a reliable method was available to assess the depth of corrosion pitting.

SUMMARY

A system and method are disclosed for enhancing pit detection and sizing in a test object. Response signatures are created and stored in a signature library to characterize various sensor responses (liftoff, orientation) and pit properties (e.g., depth, width), possibly with or without additional considerations (e.g., edges, cracks). A sensor is placed on and scanned across a surface of interest on the test object. During scanning the sensor is measured repeatedly at regular intervals. An encoder may be used to record the sensor position for each measurement. The measurement results are then correlated with one or more signatures in the signature library. A threshold is used to determine if the correlation is indicative of the detection of a pit. If so additional processing may be performed to estimate pit properties.

One aspect relates to a method for detecting and sizing a pit in a test object. The method comprises (i) storing a signature library including signatures for multiple pit depths and multiple pit diameters in a non-transient computer-readable storage medium; (ii) placing a sensor having a drive conductor and a plurality of sense elements proximate to the test object; (iii) scanning the sensor across the test object; (iv) during the scanning operating an immittance instrument to excite the drive conductor at a high frequency and a low frequency, and obtain sensor data by measuring the plurality of sense elements; and (v) operating a processor to (1) detect a pit by determining a calculated value exceeds a threshold, the calculated value being a correlation between a first signature from the signature library and a high frequency response from the sensor data; (2) estimate a pit diameter using the high frequency response; and (3) estimate a pit depth from a low frequency response from the sensor data and a second signature from the signature library associated with the estimated pit diameter.

In some embodiments, in addition to pit diameter and pit depth a third feature is varied in the signature library. For example, the third feature may be an edge response.

In some embodiments, the scanning is in a hole of the test object and the threshold is determined for a target pit depth and holes with pits deeper than the target pit depth are indicated in a report. In some embodiments, signatures are included in the signature library for pits of various depth with EDM notches at a prescribed size to enable distinguishing between pits with cracks and pits without cracks.

In some embodiments, the sensor has a drive-to-sense gap of less than 0.02 inches and a sensing element pitch of less than 0.05 inches, and the high frequency is selected such that for the test object, skin depth is less than a minimum pit diameter of interest.

In some embodiments, the scanning is a first scan at the high frequency is used to estimate the diameter of the pit and a second scan is performed with a larger drive-to-sense gap at the low frequency to estimate the depth of the pit, and the signature library is generated at least in part from a training set of pits with varied depth.

In some embodiments, signatures are stored in the signature libraries for multiple liftoffs, wherein the proper signature is selected based on a model based estimation of the liftoff near a suspected pit response.

In some embodiments, the inspection is performed through paint at a joint and the liftoff provides an estimate of paint thickness.

In some embodiments, slower scans are taken after a first rapid scan to provide higher data resolution, once a suspect defect is detected.

In some embodiments, a second scan is performed with the drive orientation at a second angle relative to the scan direction, wherein the signature library includes signatures in two drive orientations for pits and for EDM notches enabling differentiation between pits and pits with EDM notches.

In some embodiments, a second scan is performed with the drive orientation at a second angle relative to the scan direction, wherein the signature library includes signatures in two drive orientations for pits clusters enabling determination of the depth and location of the deepest pit in a cluster of pits.

In some embodiments, the response to the pit in the presence of a secondary feature is included in the signature library and the method further comprises operating the processor to subtract a secondary feature signature, after scaling, from the sensor data. Some embodiments further comprise operating the processor to estimate a material property of the test object and modifying the estimate of the material property based on the correlation.

Another aspect relates to a system for enhanced pit detection and sizing. The system comprises a processor; a non-transient computer-readable storage medium storing a signature library including signatures for multiple pit depths and multiple pit diameters; a sensor having a drive conductor and a plurality of sense elements; an immittance instrument having a signal generator electrically connected to the drive conductor of the sensor and sense hardware electrically connected to the plurality of sense elements, the signal generator configured to output an excitation signal comprising a high frequency and a low frequency; and a plurality of modules, each modules having computer code executable by the processors, the modules including a detection module that determines if a pit is detected by calculating whether a calculated value exceeds a threshold, the calculated value being a correlation between a first signature from the signature library and a high frequency response from the sensor data; a pit diameter estimating module that estimates a pit diameter using the high frequency response; and a pit depth estimating module that estimates a pit depth from a low frequency response from the sensor data and a second signature from the signature library associated with the estimated pit diameter.

In some embodiments, the sensor is a segmented field sensor.

In some embodiments, the sensor has a drive-to-sense gap of less than 0.02 inches and a sensing element pitch of less than 0.05 inches.

In some embodiments, the threshold is determined for a target pit depth, the plurality of modules further including a reporting module configured to report all pits having an estimated pit depth in excess of the target pit depth.

In some embodiments, in addition to pit diameter and pit depth, edge position is varied in the signature library.

Yet another aspect relates to another method for detecting and sizing a pit in a test object. The method comprises storing a signature library including signatures for multiple pit depths and multiple pit diameters in a non-transient computer-readable storage medium; placing a first sensor proximate to the test object, the first sensor having a drive winding, a plurality of sense elements, and a first drive-to-sense gap; first scanning the first sensor across the test object; during the first scanning operating an immittance instrument to excite the drive conductor and obtain first sensor data by measuring the plurality of sense elements; and operating a processor (i) to detect a pit by determining a calculated value exceeds a threshold, the calculated value being a correlation between a first signature from the signature library and the first sensor data, and (ii) estimate a pit diameter using the first sensor data; placing a second sensor having a second drive-to-sense gap proximate to the test object, the second drive-to-sense gap larger than the first drive-to-sense gap of the first sensor; second scanning the second sensor across the test object; during the second scanning operating the immittance instrument to obtain second sensor data from the second sensor; and operating the processor to estimate a pit depth using the second sensor data and a second signature from the signature library associated with the estimated pit diameter.

The foregoing is a non-limiting summary of the invention, which is defined by the attached claims.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
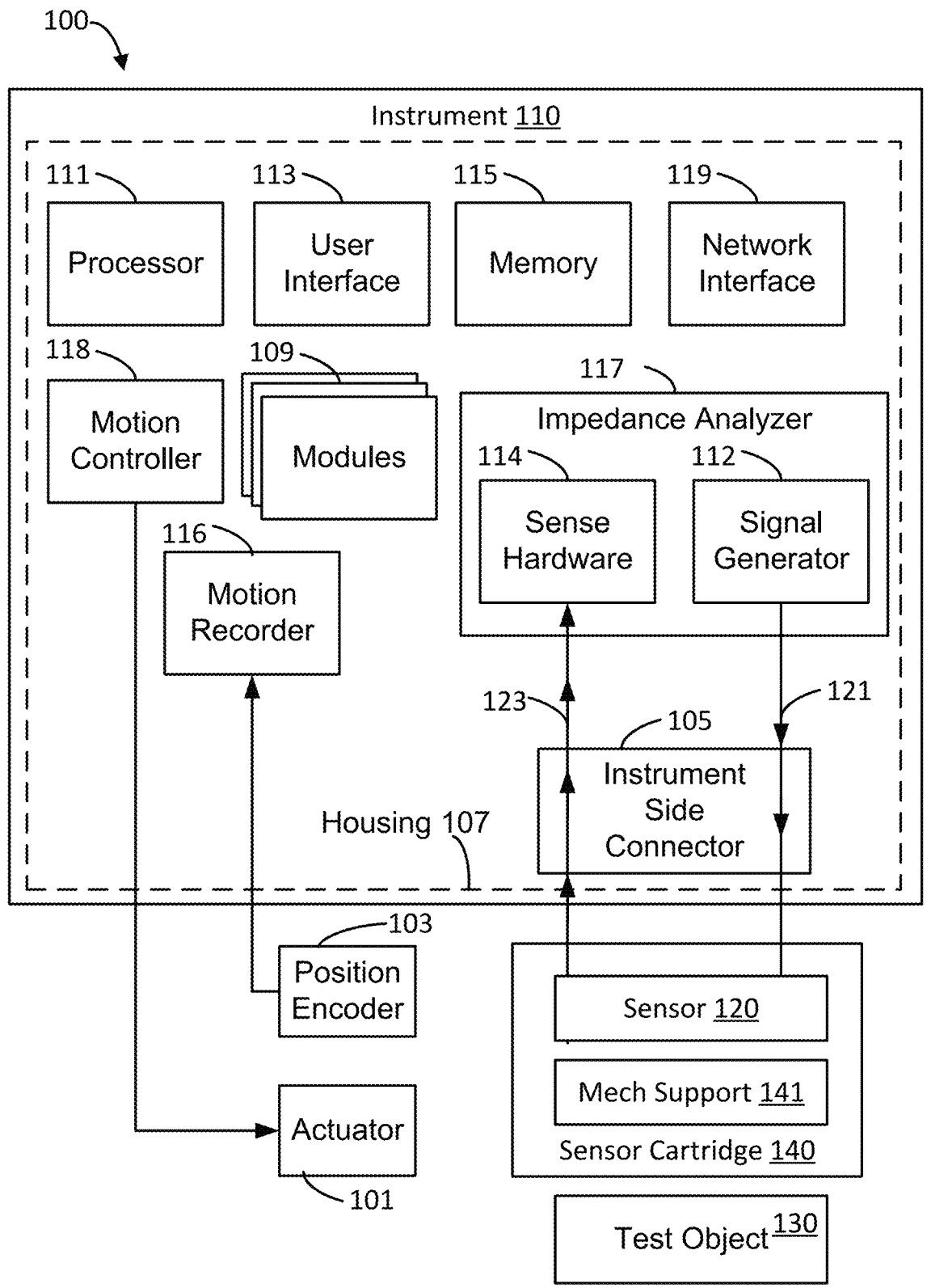
FIG. 1 is a block diagram a system for inspecting a test object according to some embodiments.

Non-destructive inspection of materials is critical for many applications, but such inspections can be challenging because of object geometry, material, and access issues. The inventors have recognized and appreciated the need for improved inspection procedures and equipment with which to perform such challenging inspections. An eddy current sensor with a linear drive conductor and multiple sensing elements at a fixed distance from the linear drive, where data is recorded simultaneously on the multiple sensing elements is used to enable reliable pit detection and enhanced pit sizing. In some embodiments, a signature library of representative pits derived from actual pits on service exposed parts (or from drilled holes representing pits) is used to process the data. The library of signatures is collected on pits from service that are later destructively tested to determine the depth, and/or from drilled holes that represent pits in the material of interest and under the geometric conditions of interest (including representative surface curvature, roughness, paint thickness, conductivity and magnetic permeability, thickness, surface treatment, etc.). In one embodiment the signature library is collected on an automated scanner to enable shifting of the sensor array relative to the pit in the transverse direction (perpendicular to the scan direction) to build a library of signature that varies with the pit position along the array. In one such embodiment the liftoff is also varied as the data is collected to capture the signature variation with liftoff. In another such embodiment the pit position relative to an edge is varied. In another such embodiment the conductivity of the material is varied. In each of these embodiments varied pit diameter and depth are tested to build the library. In some embodiments, computer simulations may be used to fill in the library enabling fewer empirical responses to be collected, in one such embodiment the empirical signatures are used to calibrate and/or validate the computer simulated signatures. In each embodiment, the signature library used for inspection is culled to reduce the number of signatures needed to obtain a sufficient performance, where sufficient performance is determined by testing the processing on a set of representative pits or simulated pits. The goal is to enable sufficiently rapid processing to allow the inspection to be performed practically within typical cost constraints. Note that substantial savings come from not needing to strip paint and from determining the depth of pits to avoid removal of parts from service that can meet service requirements and to avoid expending financial and personnel resources for remediation actions on parts that cannot be repaired.

In one embodiment, the drive-to-sense gap must be greater than half the pit depth to enable pit depth estimation. In one such embodiment, a high frequency is used to estimate the surface area of the pit and then given the surface area the correct signature is selected to filter the data and obtain a filtered response that is then correlated with depth based on prior knowledge from a training set or computer simulations or both. In one such embodiment a small drive-to-sense gap is used at high frequencies to get higher resolution data for pit detection and surface extend determination and then a larger drive-to-sense gap sensor is used at lower frequencies to get an improved pit depth estimate.

For pit clusters, with multiple pits of varied depth the goal is to determine the depth of the deepest pit. Because eddy current patterns are affected by neighboring pits a rule based signature library method is disclosed. In this method, first the pit pattern is determined at high frequency with a higher resolution sensor array with a relatively small drive-to-sense gap. Then given the pattern and the largest pit responses are identified and the algorithm uses prior data taken on sets of two, three and possibly four drilled holes (flat bottom holes) that represent pits or from computer simulations of simulated pit clusters. Approximately matching pit patterns for the two, three or four pits are then used to identify the pit family observed in the part. Then correlation tables are used to estimate the pit depth. Note that the pit cluster library must have sufficient representation of pit depths, proximities, and diameters, to enable sufficient identification of the actual pit cluster family and enable accurate depth estimation for the deepest pit.

In another embodiment the possibility of a cavity below the surface that is larger than the exposed pit diameter is determined. In this embodiment, two frequencies are used with a single drive-to-sense gap sensor scan, with two sensor scans with two or more drive-to-sense gaps or with a segmented field sensor that incorporates two rows of sensing elements with different drive-to-sense gaps. The since it is challenging to fabricate such samples using drilled holes, computer simulations are used to augment data from actual pits which are destructively tested. In some embodiments, the signature library is built by recording data and then successively etching the surface (or grinding) to remove the pits and recording the sensor data with increments of removal, while also taking photographs or acetate replicas to record pit geometry at each increment.

In one embodiment, data from service is taken over years to continue to learn and augment knowledge through sensor data that is archived and through selective destructive testing of samples. In one such embodiment the action of destructive testing for identified samples is prompted by an algorithm that identifies gaps in the signature library representations that when filled in will improve the pit detection, sizing and depth estimates.

In each of the above embodiments there may be added value for recording data with multiple sensor drive orientations. In one such embodiment determining if a crack has formed from a single pit or from a pit cluster. In one such embodiment the signatures from pits with EDM notches are recorded and these signatures are used to determine if the pit has a crack within it or emanating from it. In one such embodiment the crack length is estimated using a signatured library generated using methods described above but also including EDM notches of varied length and depth to represent the range of sizes of interest. In one such embodiment, real cracks are generated with representative pits using either scanning or permanently mounted sensors to monitor crack growth and size with known defect sizes determined using acetate replicas or other means. The scanning data recorded during testing then becomes part of the signature library used to process data and detect and size cracks at pits.

The applications for this method include bolt hole inspection, inspection of aircraft joints for corrosion, piping and pipelines, bridges, engine components, machinery, lifting equipment, and any assets that use metals and require structural integrity.

The remainder of the Detailed Description is organized as follows. Section I provides an overview for an inspection system. Section II provides an example of pit detection according to some embodiments. Section III provides a pit detection and sizing according to some embodiments. Section IV provides further discussion and details on the use of a signature library according to some embodiments. Section V provides further discussion on shape filtering according to some embodiments. Section VI describes a modular test specimen set for holes. Finally, Section VII provides a closing discussion.

Section I—System Overview

FIG. 1 is a block diagram of a system 100 for inspecting a test object 130. System 100 includes an instrument 110 and a sensor cartridge 140. Instrument 110 may be housed in a housing 107; in some embodiments the housing is substantially cylindrical in shape. Sensor cartridge 140 may have a rigid connector which interfaces both mechanically and electrically with an instrument side connector 105. Advantageously in some embodiments both the electrical and mechanical connections of sensor cartridge 140 engage simultaneously with instrument side connector 105. In some other embodiments, the sensor cartridge is functionally connected to instrument side connector 105 through a cable. Sensor cartridge 140 in some embodiments also includes a flexible sensor 120, and a mechanical support 141 to which the sensor is attached. Sensor 120 may be attached to mechanical support 141 with glue, tape, double sided tape, or in any suitable way. Instrument 110 is configured to provide excitation signals 121 to sensor 120 and measure the resulting response signals 123 of sensor 120. Response signals 123 may be measured and processed to estimate properties of interest, such as electromagnetic properties (e.g., electrical conductivity, permeability, and permittivity), geometric properties (e.g., layer thickness, sensor liftoff), material condition (e.g., fault/no fault, crack size, layer to layer bond integrity, porosity, residual stress level, temperature), or any other suitable property or combination thereof including properties of the fabricated part and the powder. (Sensor liftoff is a distance between the sensor and the closest surface of the test object for which the sensor is sensitive to the test object's electrical properties.)

Instrument 110 may include a processor 111, a user interface 113, memory 115, an impedance analyzer 117, and a network interface 119. Though, in some embodiments of instrument 110 may include other combinations of components. While instrument 110 is drawn with housing 107, it should be appreciated that instrument 110 may be physically realized as a single mechanical enclosure; multiple, operably-connected mechanical enclosures, or in any other suitable way. For example, in some embodiments it may be desired to provide certain components of instrument 110 as proximal to sensor 120 as practical, while other components of instrument 110 may be located at greater distance from sensor 120.

Processor 111 may be configured to control instrument 110 and may be operatively connected to memory 115. Processor 111 may be any suitable processing device such as for example and not limitation, a central processing unit (CPU), digital signal processor (DSP), controller, addressable controller, general or special purpose microprocessor, microcontroller, addressable microprocessor, programmable processor, programmable controller, dedicated processor, dedicated controller, or any suitable processing device. In some embodiments, processor 111 comprises one or more processors, for example, processor 111 may have multiple cores and/or be comprised of multiple microchips. Processing of sensor data and other computations such as for control may be performed sequentially, in parallel, or by some other method or combination of methods.

Memory 115 may be integrated into processor 111 and/or may include "off-chip" memory that may be accessible to processor 111, for example, via a memory bus (not shown). Memory 115 may store software modules that when executed by processor 111 perform desired functions. Memory 115 may be any suitable type of non-transient computer—readable storage medium such as, for example and not limitation, RAM, a nanotechnology-based memory, optical disks, volatile and non-volatile memory devices, magnetic tapes, flash memories, hard disk drive, circuit configurations in Field Programmable Gate Arrays (FPGA), or other semiconductor devices, or other tangible, non-transient computer storage medium.

Instrument 110 may have one or more functional modules 109. Modules 109 may operate to perform specific functions such as processing and analyzing data. Modules 109 may be implemented in hardware, software, or any suitable combination thereof. Memory 115 of instrument 110 may store computer-executable software modules that contain computer-executable instructions. For example, one or more of modules 109 may be stored as computer-executable code in memory 115. These modules may be read for execution by processor 111. Though, this is just an illustrative embodiment and other storage locations and execution means are possible.

Instrument 110 provides excitation signals for sensor 120 and measures the response signal from sensor 120 using impedance analyzer 117. Impedance analyzer 117 may contain a signal generator 112 for providing the excitation signal to sensor 120. Signal generator 112 may provide a suitable voltage and/or current waveform for driving sensor 120. For example, signal generator 112 may provide a sinusoidal signal at one or more selected frequencies, a pulse, a ramp, or any other suitable waveform. Signal generator may provide digital or analog signals and include conversion from one mode to another.

Sense hardware 114 may comprise multiple sensing channels for processing multiple sensing element responses in parallel. As there is generally a one to one correspondence between sense elements and instrumentation channels these terms may be used interchangeably. It should be appreciated that care should be used, for example, when multiplexing is used to allow a single channel to measure multiple sense elements. For sensors with a single drive and multiple sensing elements such as the MWM®-Array eddy current array available from JENTEK® Sensors, Inc., the sensing element response may be measured simultaneously at one or multiple frequencies including simultaneous measurement of real and imaginary parts of the transimpedance. Though, other configurations may be used. For example, sense hardware 114 may comprise multiplexing hardware to facilitate serial processing of the response of multiple sensing elements and for eddy current arrays other than MWM-Arrays multiplexing may be used for combinations of sensing elements and drive elements. Some embodiments use MWM-Array formats to take advantage of the linear drive and the ability to maintain a consistent eddy current pattern across the part using such a linear drive. Sense hardware 114 may measure sensor transimpedance for one or more excitation signals at on one or more sense elements of sensor 120. It should be appreciated that while transimpedance (sometimes referred to simply as impedance), may be referred to as the sensor response, the way the sensor response is represented is not critical and any suitable representation may be used. In some embodiments, the output of sense hardware 114 is stored along with temporal information (e.g., a time stamp) to allow for later temporal correlation of the data, and positional data correlation to associate the sensor response with a particular location on test object 130. Instrumentation may also operate in a pulsed mode with time gates used to provide multiple sensing outputs and multiple channels used to acquire data from multiple sensing elements. If these sensing elements have different drive-sense gaps (distance between a drive conductor (or electrode) and the sensing winding (or electrode), then this is referred to as a segmented field sensor. Thus, sensor operation can be at a single frequency, multiple frequencies, or in a pulsed mode where the drive is turned on and off in a prescribed manner or switched between two or more modes of excitation.

Sensor 120 is an eddy-current sensor; though in some other embodiments it may be a dielectrometry sensor, thermography method, or utilize any other suitable sensing technology or combination of sensing technologies. In some embodiments sensor 120 provides temperature measurement, voltage amplitude measurement, strain sensing or other suitable sensing modalities or combination of sensing modalities. In some embodiments, sensor 120 is an eddy-current sensor such as an MWM, MWM-Rosette, or MWM-Array sensor available from JENTEK Sensors, Inc., Marlborough, MA A discussion of some MWM-Array sensors is found in U.S. Pat. No. 6,784,662, issued on Aug. 31, 2004 which is hereby incorporated by reference in its entirety. Sensor 120 may be a magnetic field sensor or sensor array such as a magnetoresistive sensor (e.g., MR-MWM-Array sensor available from JENTEK Sensors, Inc.), a segmented field MWM sensor, and the like. In some embodiments sensor 120 is an interdigitated dielectrometry sensor or a segmented field dielectrometry sensor such as the IDED® sensors also available from JENTEK Sensors, Inc. Segmented field sensors have sensing elements at different distances from the drive winding or drive electrode to enable interrogation of a material to different depths at the same drive input frequency. Sensor 120 may have a single or multiple sensing and drive elements. Sensor 120 may be scanned across, mounted on, or embedded into test object 130.

In some embodiments, the computer-executable software modules 109 may include a sensor data processing module, that when executed, estimates properties of test object 130. The sensor data processing module may utilize multi-dimensional precomputed databases that relate one or more frequency transimpedance measurements to properties of test object 130 to be estimated. The generation of suitable databases and the implementation of suitable multivariate inverse methods are described, for example, in U.S. Pat. No. 7,467,057, issued on Dec. 16, 2008, and U.S. Pat. No. 8,050,883, issued on Nov. 1, 2011, both of which are herein incorporated by reference in their entirety. The sensor data processing module may take the precomputed database and sensor data and, using a multivariate inverse method, estimate material properties for the processed part or the powder. Though, the material properties may be estimated using any other analytical model, empirical model, database, look-up table, or other suitable technique or combination of techniques.

User interface 113 may include devices for interacting with a user. These devices may include, by way of example and not limitation, keypad, pointing device, camera, display, touch screen, audio input and audio output.

Network interface 119 may be any suitable combination of hardware and software configured to communicate over a network. For example, network interface 119 may be implemented as a network interface driver and a network interface card (NIC). The network interface driver may be configured to receive instructions from other components of instrument 110 to perform operations with the NIC. The NIC provides a wired and/or wireless connection to the network. The NIC is configured to generate and receive signals for communication over network. In some embodiments, instrument 110 is distributed among a plurality of networked computing devices. Each computing device may have a network interface for communicating with other computing devices forming instrument 110.

In some embodiments, multiple instruments 110 are used together as part of system 100. Such systems may communicate via their respective network interfaces. In some embodiments, some components are shared among the instruments. For example, a single computer may be used to control all instruments. In one embodiment multiple areas on the test object are scanned using multiple sensors simultaneously or in an otherwise coordinated fashion to use multiple instruments and multiple sensor arrays with multiple integrated connectors to inspect the test object surface faster or more conveniently.

Actuator 101 may be used to position sensor cartridge 140 with respect to test object 130 and ensure that the liftoff of the sensor 120 is in a desired range relative to the test object 130. Actuator 101 may be an electric motor, pneumatic cylinder, hydraulic cylinder, or any other suitable type or combination of types of actuators for facilitating movement of sensor cartridge 140 with respect to test object 130. Actuators 101 may be controlled by motion controller 118. Motion controller 118 may control sensor cartridge 140 to move sensor 120 relative to test object 130.

Regardless of whether motion is controlled by motion controller 118 or directly by the operator, position encoder 103 and motion recorder 116 may be used to record the relative positions of sensor 120 and test object 130. This position information may be recorded with impedance measurements obtained by impedance instrument 117 so that the impedance data may be spatially registered.

For some applications the performance of system 100 depends (among other things) on the proximity of sensor 120 to test object 130; that is to say the sensor liftoff may be critical to performance for such applications. For example, crack detection in an aerospace application may require cracks 0.5 mm (0.02 inches) in length be reliably detectable in test object 130 (e.g., a turbine disk slot). In order to achieve reliable detection of a small crack, sensor 120's liftoff may need to be kept to under 0.25 mm (0.010 inches). Further, for such an application, sensor 120 may preferably be a sensor array, thus the liftoff of each element in the array may need to be kept to under 0.25 mm (0.010 inches). (It should be appreciated that these dimensions are illustrative and the specific requirements will be dictated by the details of the application.) Measurements may be complicated when test object 130 has a complex curved surface that may change along a measurement scan path.

Section II—Example Pit Detection Results

Figure 2C:
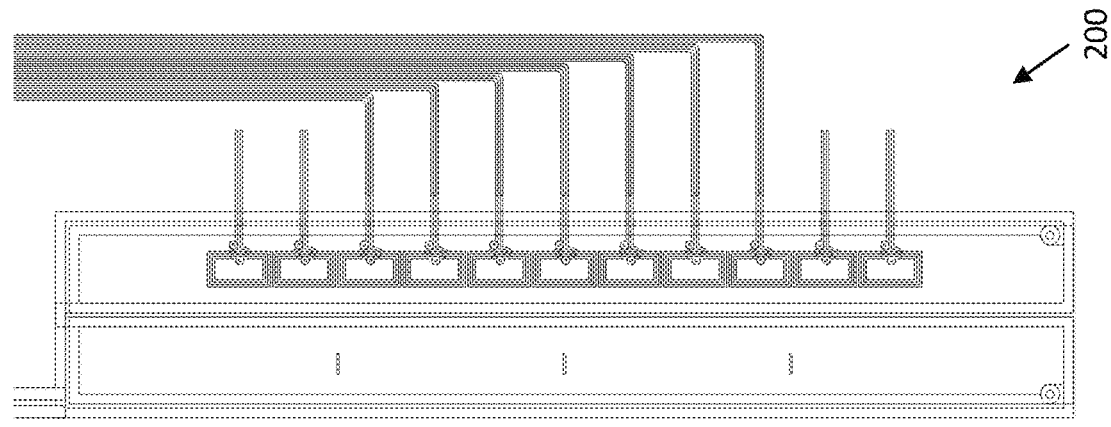
FIGS. 2A-2C are various schematic views of a sensor according to some embodiments.
Figure 2B:
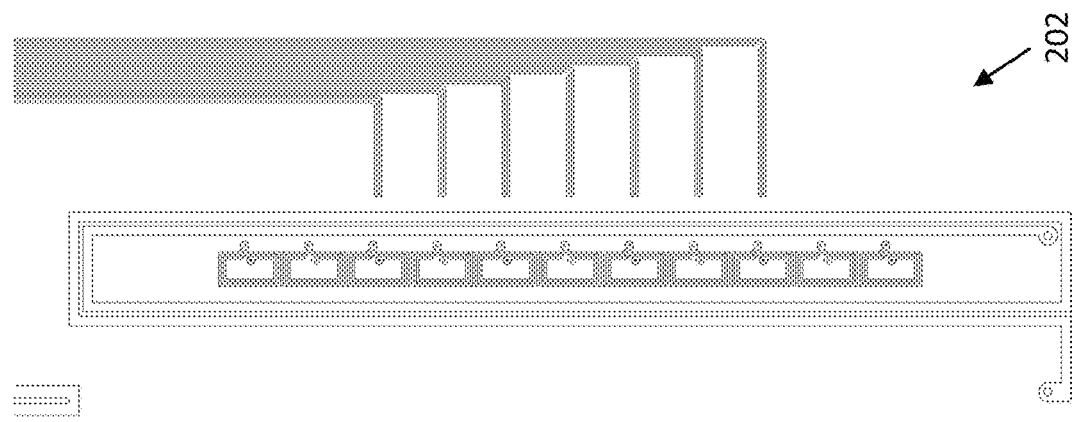
Figure 2A:
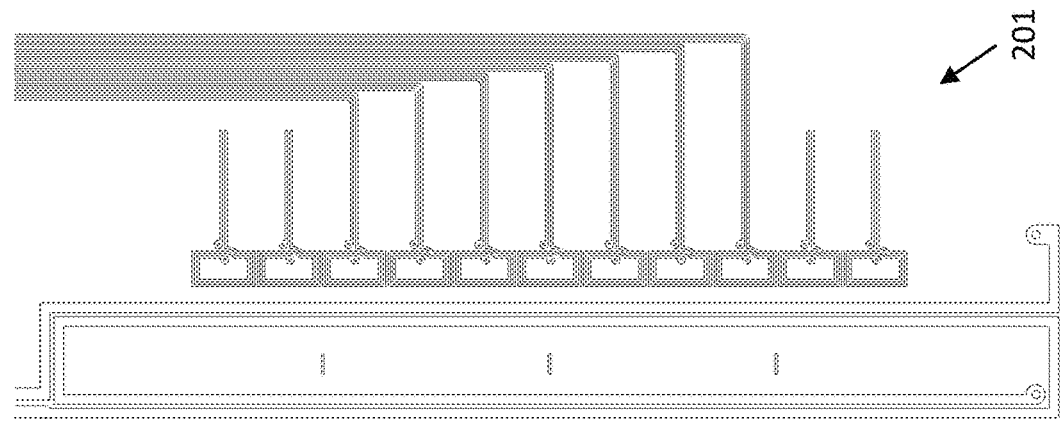

A study was performed to investigate the sensitivity to small pit defects in aluminum using commercially available sensors and systems available from JENTEK® Sensors, Inc. An eddy current sensor similar to the sensor shown in FIGS. 2A-2C was used for measurement. The sensor geometry is illustrative and the specific sensor dimensions may be determined based on the particular application requirements. FIG. 2A and FIG. 2B show the electrical traces of a first layer 201, and a second layer 202 respectively of a sensor 200 shown in combined form in FIG. 2C. In fabrication the first and second layers are electrically insulated from one another except at via locations where an electrical connection is made between the two layers.

A simple pit sample was created to represent damage on the near surface of the first layer and, since most paint layers are electrically insulating, this type of damage could be observed through paint. Note that it is practical to develop other sensors with smaller sensing elements specifically for small pit detection and sizing. However, this would require multiple scans if also used for buried damage. Thus, using an eddy current sensor array (designated FA296) that is similar to sensor 200 shown in FIG. 2C, for both small pits and buried corrosion is more efficient for inspection of joints with corrosion. Note that two exemplary applications for pit detection are described in this section; one is pit detection at the external surface of an aircraft joint and the second is pit sizing and detection of cracks near pits in bolt holes. For bolt holes, the increased drive sense gap and the desire to keep the sensor small must be balanced to retain both pit characterization capability and crack detection capability. Testing of sensors with different drive sense gaps and validation of performance is recommended on a set of samples with varied pit sizes and depths as well as with cracks or EDM notches alone and with both pits and notches. In one embodiment of both bole hole inspection and joint surface pit detection a signature library is developed from varied pit samples with pits of different depth and diameter. These are used to both estimate pit depth and to suppress the presence of pits to enable improved crack detection. In another such embodiment a signature library is also developed for pits with EDM notches initiating from the pits; this enables distinguishing between pits with cracks and pits without cracks. In a typical application the bolt hole inspection report or results would highlight holes with pits above a predetermined allowable depth, while also flagging crack-like defects that are above an acceptance threshold. Note that in each described case scratches with varied depths could be introduced instead of pits for scratch detection and suppression. Also note that it is practical to use computer simulations to fill out signature libraries. But when using computer simulations it is recommended that empirical validation and calibration of models is included when needed to ensure robustness and accuracy of the signatures generated by computers based on physics modeling.

In all embodiments a sensor with a linear drive and a row of sensing elements is recommended at a fixed distance from the drive where the data is recorded at multiple sensing element simultaneously to enable re-scaling of responses for pits or scratches or crack like defects that occur between channels, as described in other publications by some of the inventors. In some embodiments this includes corrections for the presence of edges near pits or for varied layer thickness in a bolt hole inspection or for an edge or fastener in a joint. In cases where multiple features such as scratches, pits, edges, fasteners, grooves, or other damage, surface condition, or geometric features are present, samples that include both multiple examples of the individual feature or damage as well as sample with combinations of features are recommended for building the signature libraries for both primary features that need detection and for secondary features that need suppression in a cluttered environment. In each case a combination of empirical samples for signature generation and testing along with computer simulations to fill out the signature libraries is recommended. The size of the signature library used for processing may be smaller for processing during inspections to keep up with the needed inspection throughput, while post processing or separate processing on a second computer is recommended with a larger signature library for holes or joints or other test articles (e.g., gun barrels, engine parts, etc.) to enable improved detection reliability and suppression of inconsequential features, and improved characterization and sizing of primary and secondary features.

Figure 3A:
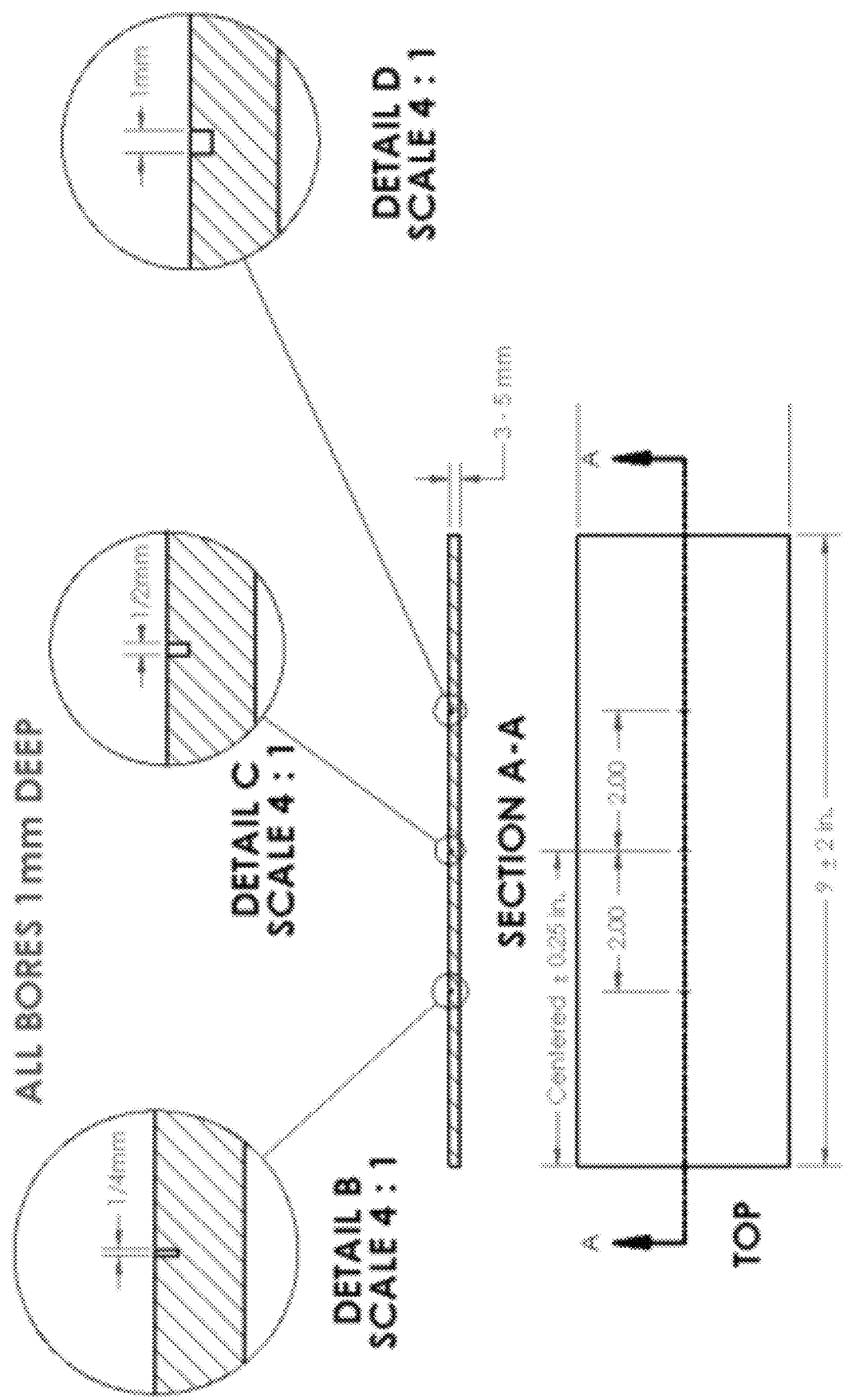
FIG. 3A is an aluminum pit sample showing the row of pits at varying diameters and constant 0.040 in. (1 mm) depth.
Figure 3B:
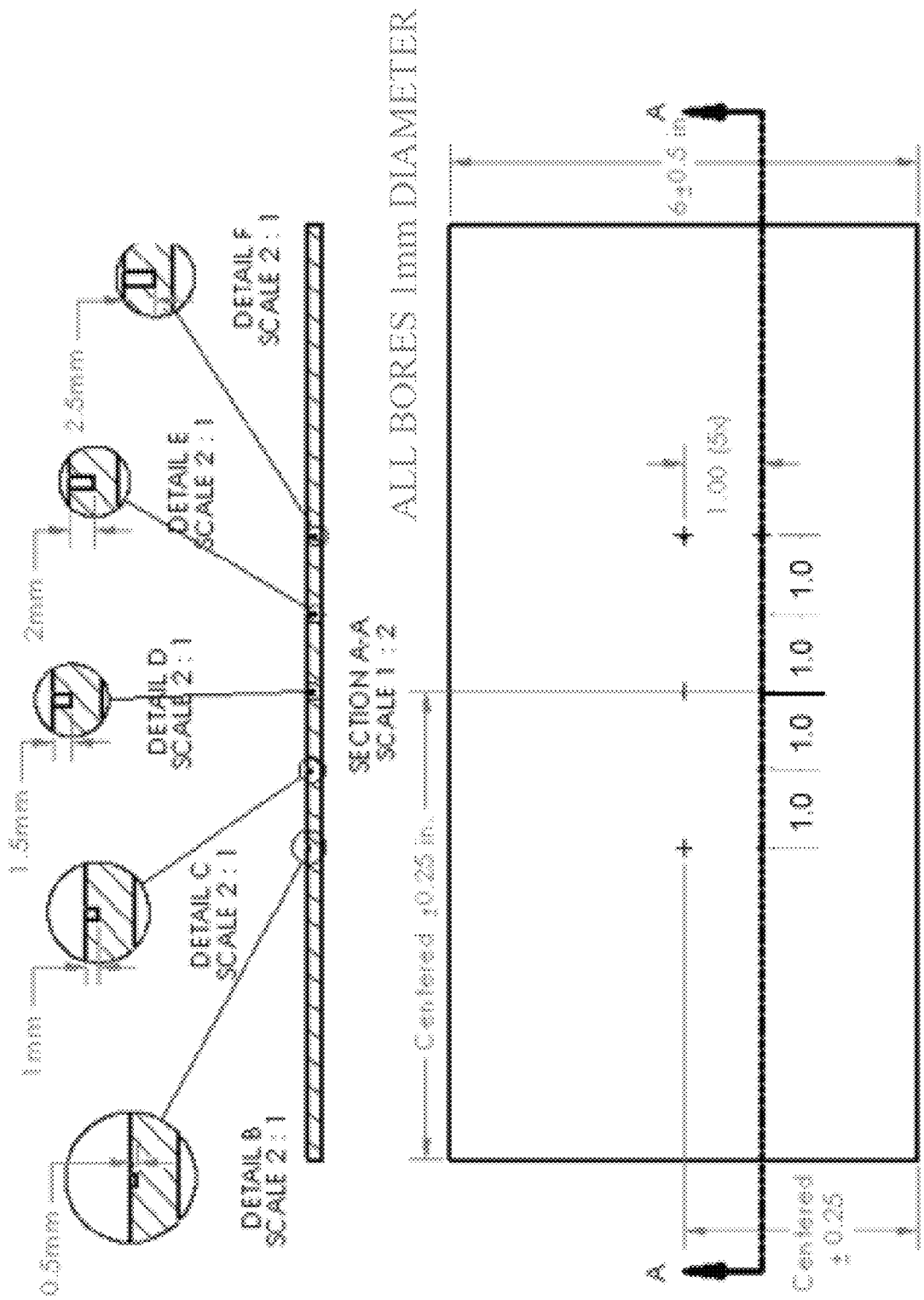
FIG. 3B is an aluminum pit sample showing the row of pits at varying depths and constant 0.040 in. (1 mm) diameter.

The sample, shown in FIGS. 3A and 3B, contains two rows of pits. One row consists of three pits at a depth of 0.040 in. (1 mm) and diameters of 0.010 in. (0.25 mm), 0.020 in. (0.5 mm), and 0.040 in. (1 mm). The other row consists of five pits having a diameter of 0.040 in. (1 mm) and depths of 0.020, 0.040, 0.060, 0.080, and 0.100 in. (0.5, 1.0, 1.5, 2.0, and 2.5 mm). The same sensor used for the wall loss and exfoliation applications, the FA296, was used to scan across this pit sample as well. The frequencies used with the FA296 were 2.56, 10.24, and 40.96 kHz. In this case, the measurement data at each excitation frequency was processed using measurement grids to provide an estimate of the material conductivity and lift-off.

Figure 4A:
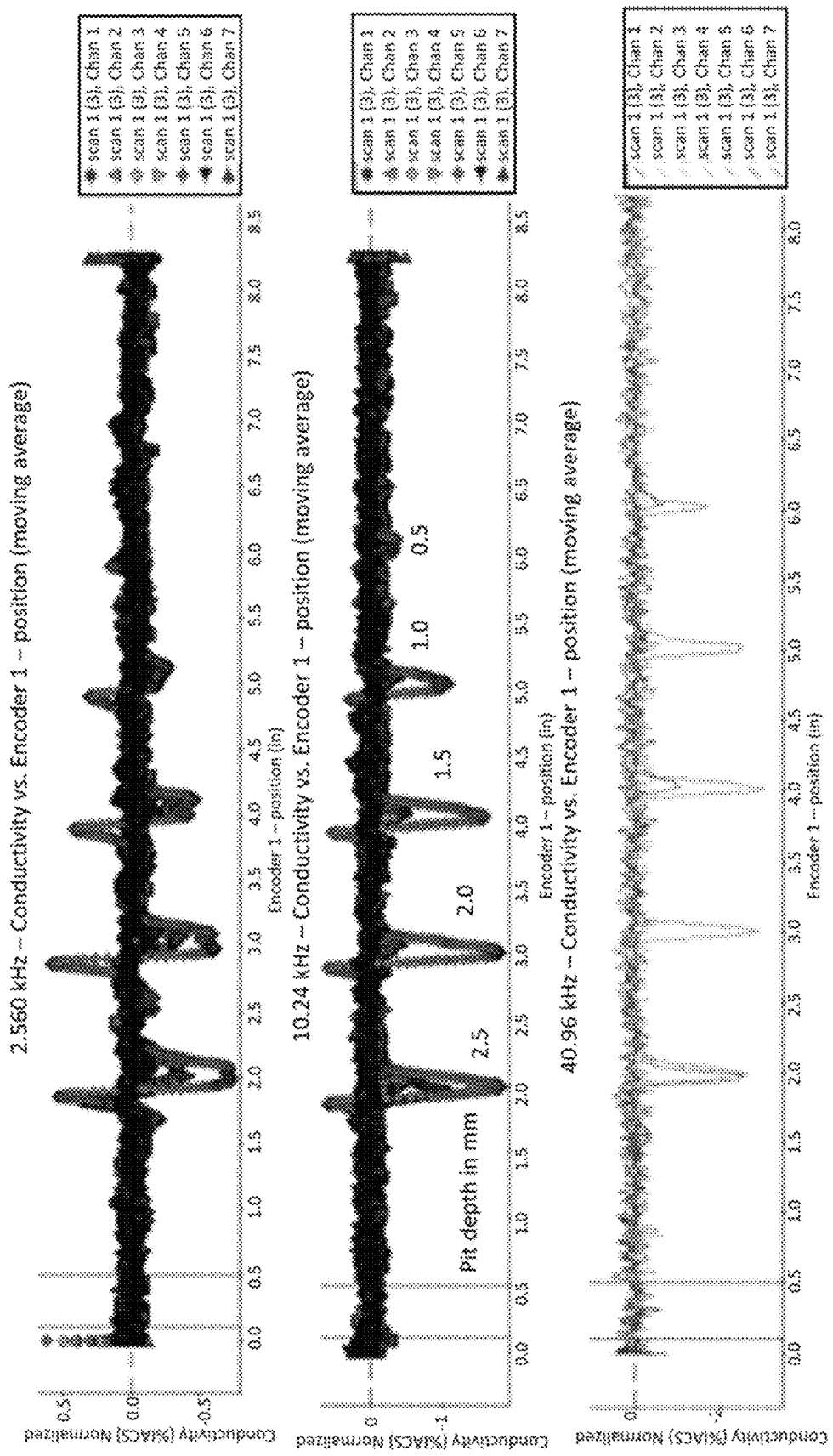
FIGS. 4A and 4B show (A) conductivity and (B) liftoff B-scans at all three frequencies across the pits with varying depths using an eddy current array sensor with a linear drive winding.
Figure 4B:
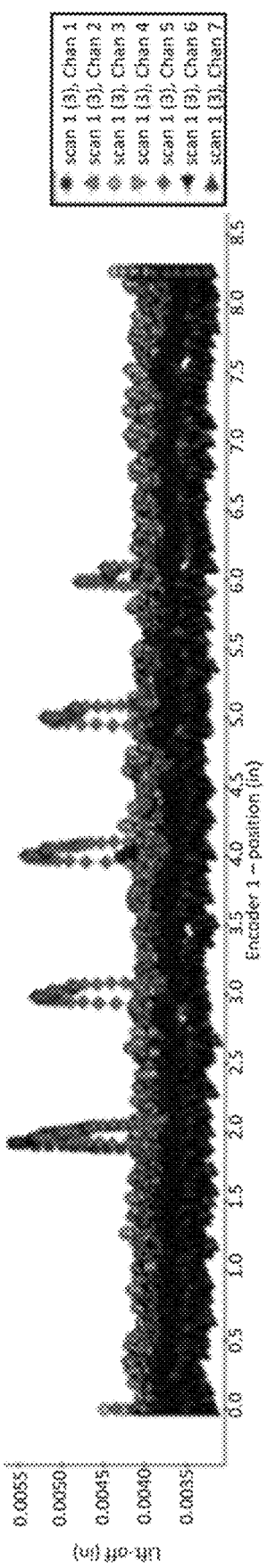
Figure 4B:
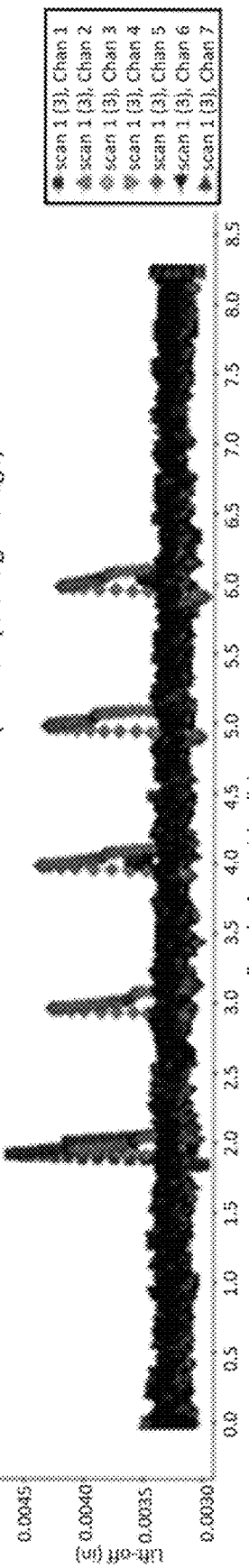
Figure 4B:
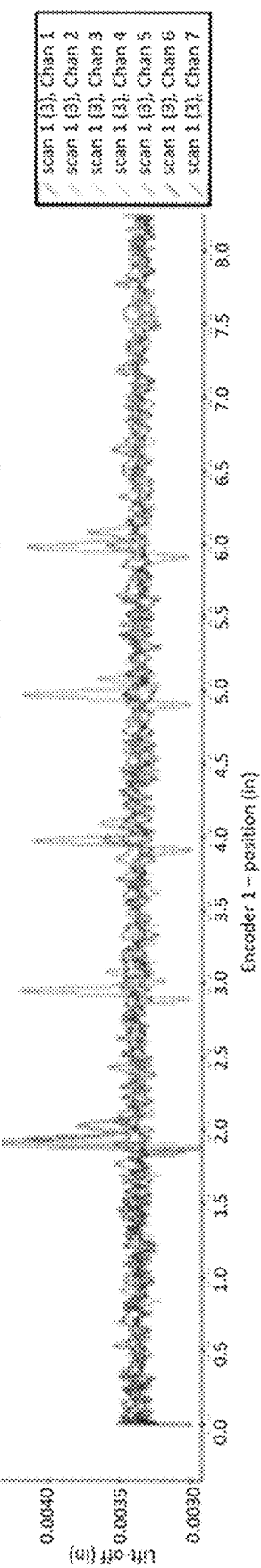

Conductivity and lift-off B-scan results across these pits can be seen in FIG. 4A and FIG. 4B, respectively. The near-surface material loss generally appears as a local increase in the lift-off. The effective electrical conductivity response varies with frequency but appears as a local decrease in the electrical conductivity at the higher frequencies, while an increase in the conductivity is apparent at the lowest frequency. While the lift-off and the highest frequency electrical conductivity simply indicate the presence of the material loss, the lower frequency electrical conductivity shows a consistent variation with loss depth which suggests a capability to estimate the material loss extent.

Note that previous measurements on subsurface flaws showed that the sensor arrays are sensitive to the volume of the material loss when the material loss areal extent is small compared to the footprint of the drive winding. If the areal extent can be inferred from the scan data, then the depth of the material loss can be deduced from the estimated properties. In addition, the signature responses for the near surface material loss are distinct from the fastener responses typically observed above. This suggests that the same type of shape filter or fastener correction algorithm could be applied here as well.

Figure 5:
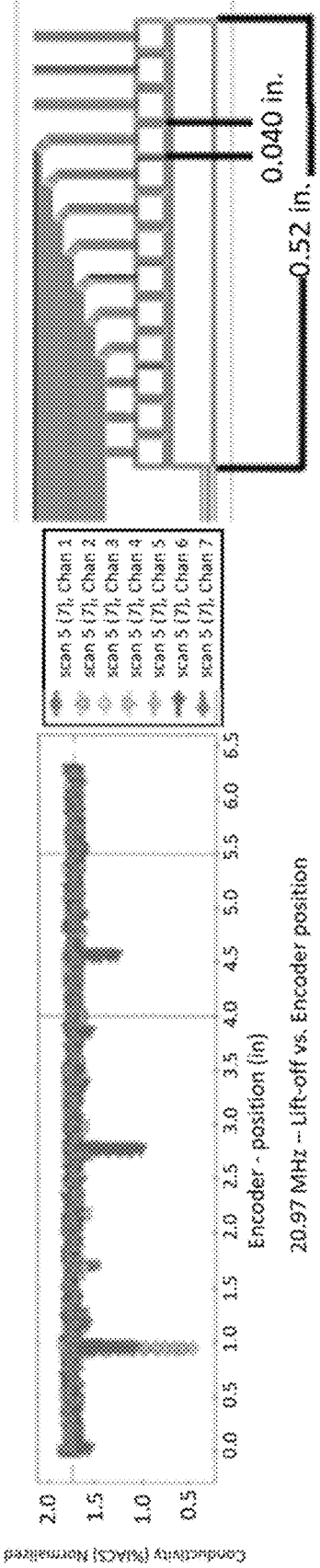
FIG. 5 shows, at left, B-scans across the varying diameter pits using another eddy current array sensor with a linear drive winding, at top-right, a schematic of the eddy current array sensor, and at bottom-right, a grid view of a channel crossing the largest pit.
Figure 5:
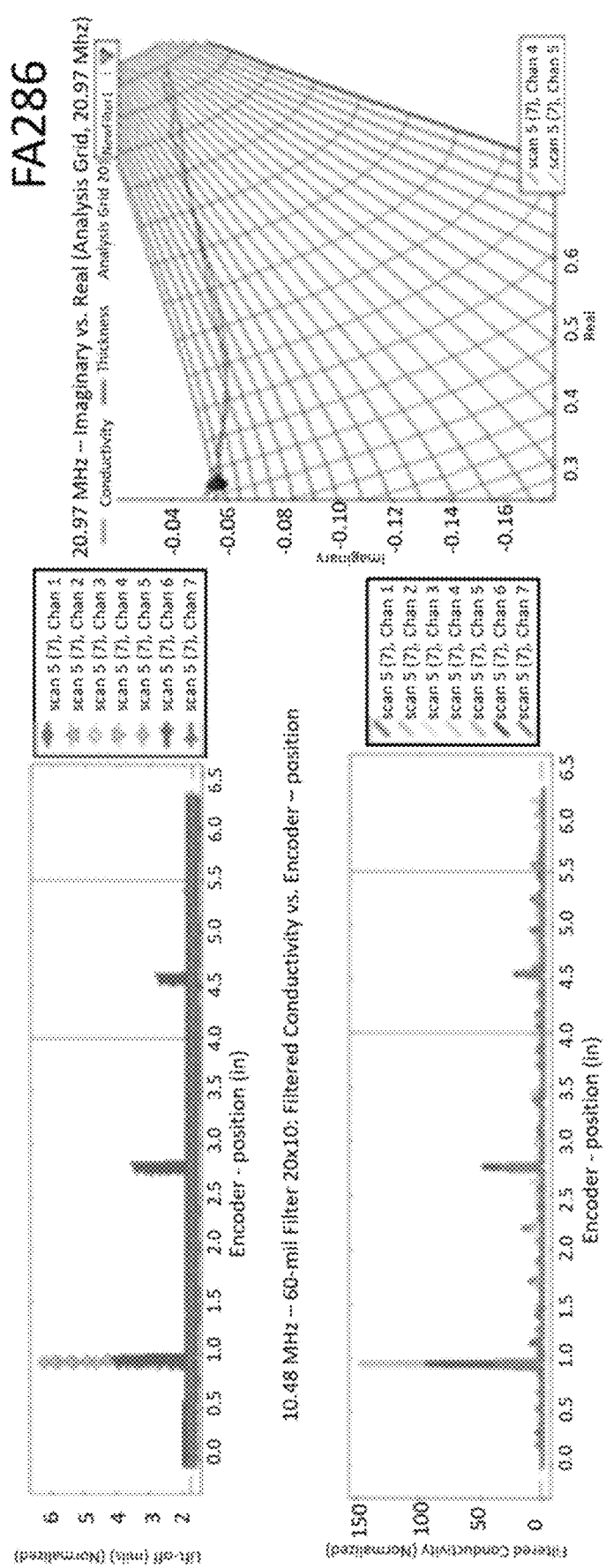

For comparison, some data was also taken with a smaller eddy current sensor array, the FA286. This sensor array, shown in FIG. 5 (upper right), also works with the jET and has seven channels; but each sense element is only 0.040 in. wide (compared to 0.25 in. for the FA296), and the drive winding is substantially smaller than the FA296. This results in a smaller spatial wavelength sensor array, which limits the detection sensitivity to damage within approximately 0.040 in. of the surface, but this is suitable for near-surface damage detection of skin layers in structures. In this case, data was taken at a high excitation frequency of 20.97 MHz. The estimated conductivity and lift-off results are shown FIG. 119 for the sample with varying pit depths. The pit damage results in a local increase in lift-off and reduction in conductivity. The amplitudes of the changes do not trend with the depths of the pits (data not shown) as expected since the depth of sensitivity for this sensor is less than 0.04 inches. However, as shown in the figure, the response varies with diameter; this indicates that a small sensing element array can be used to determine the surface extent of a pit and, when combined with FA296 for volumetric material loss assessment, can provide more robust pit characterization. Note that the filtered response shows the result of applying a filter that matches the shape of a flaw response to the measurement data to highlight the flaw conditions. Note that this filter is a first attempt at providing a shape-filtered response for the pits but also includes a correction for small defect positions between channels.

Section III—Pit Detection & Sizing

Figure 6:
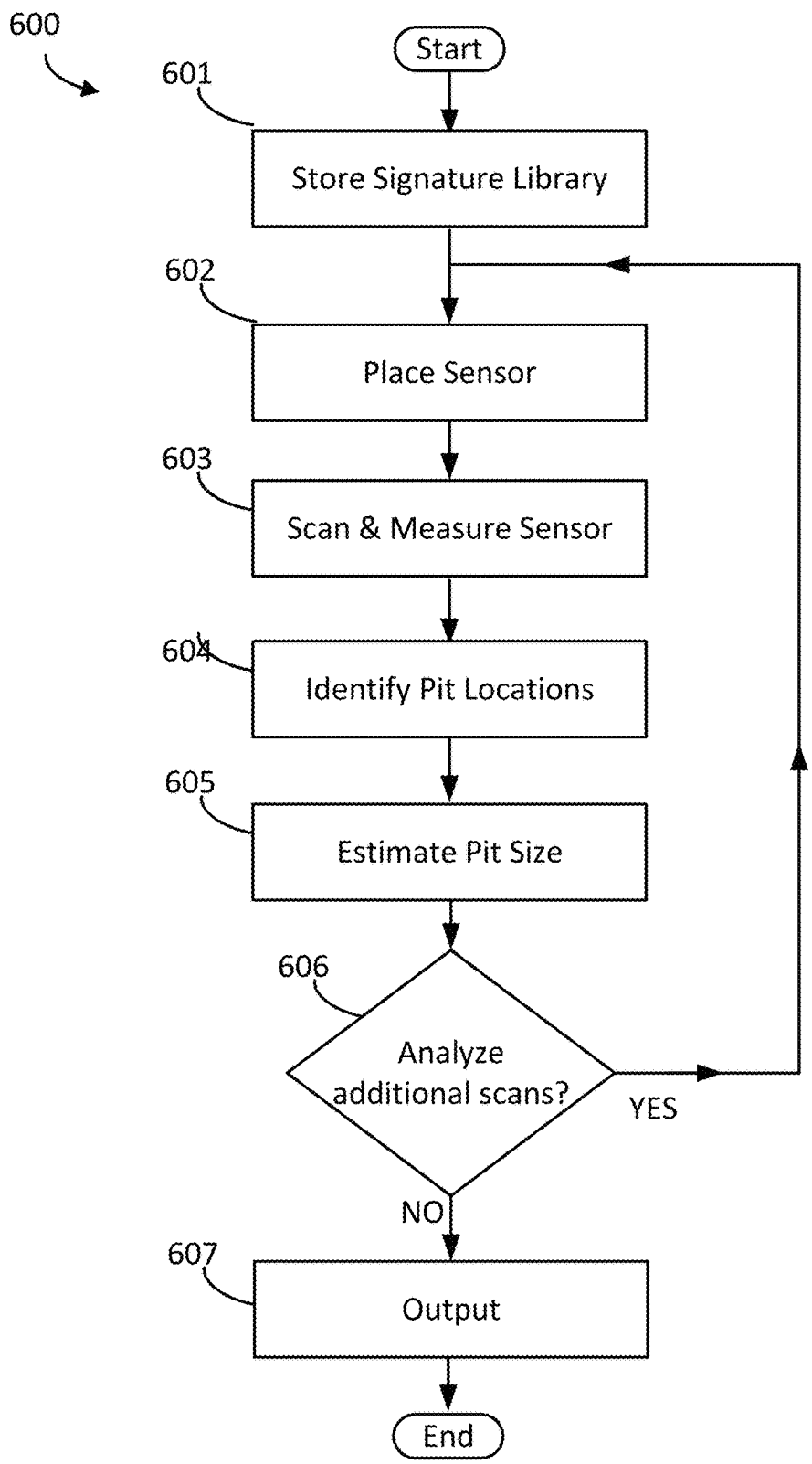
FIG. 6 is a flow diagram for enhancing pit detection and sizing in a test object, according to some embodiments.

FIG. 6 shows a method 600 for enhancing pit detection and sizing in a test object. Method 600 may utilize system 100, though method 600 may be implemented in any suitable way.

At step 601 a signature library is stored in a computer memory such as memory 115 (FIG. 1). The signature library may have one or more pit signatures. The pit signature library may be generated and updated, for example, in ways discussed below in Section V.

Figure 7A:
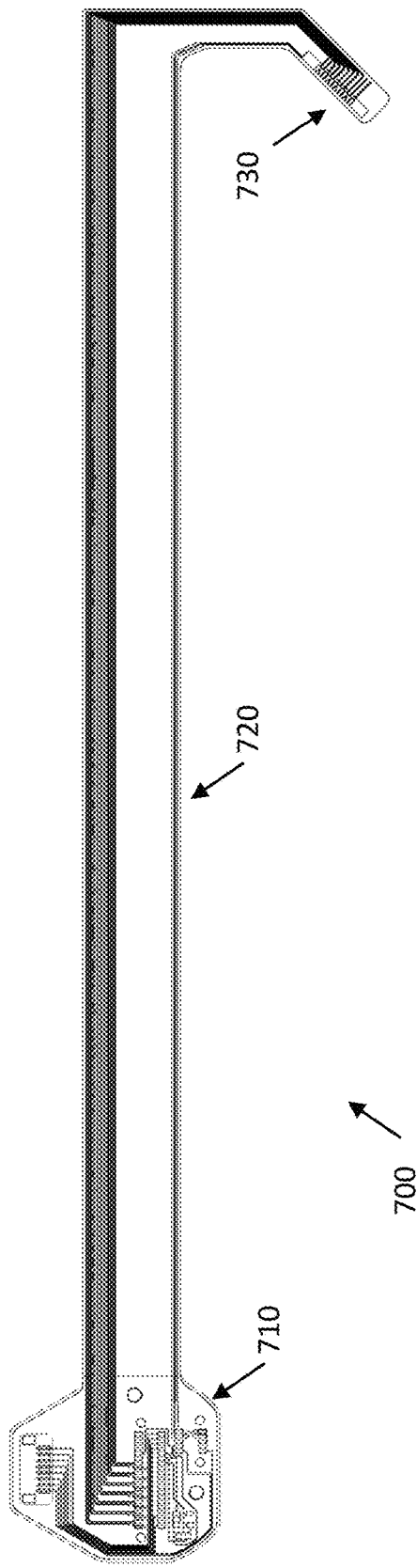
FIG. 7A is a schematic view of a sensor, according to some embodiments.
Figure 7B:
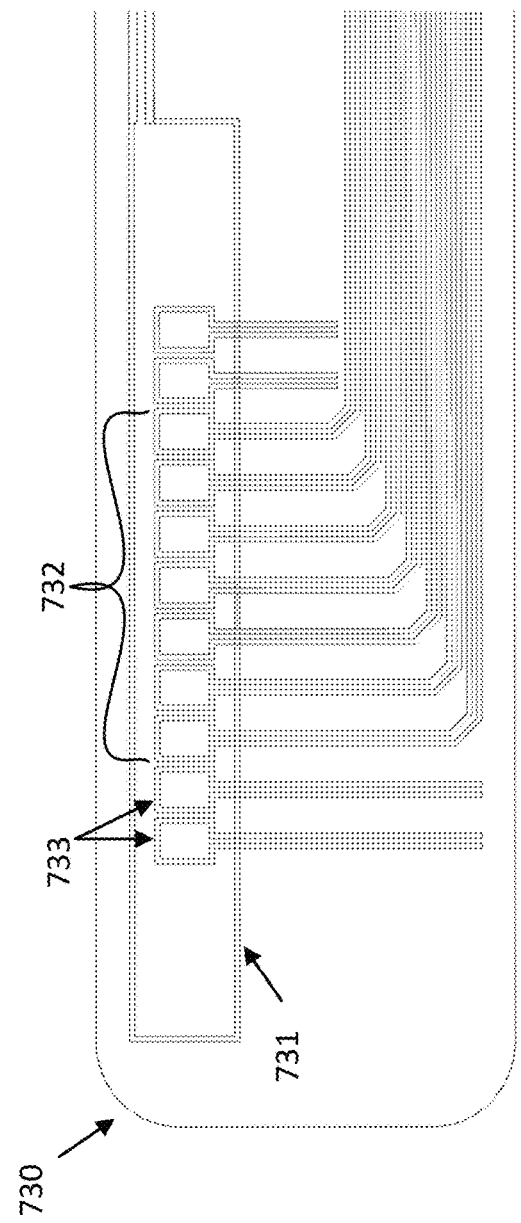
FIG. 7B is a detailed view of the sensing region of said sensor, according to some embodiments.

At step 602 a sensor is placed proximate to the test object. The sensor may be any suitable sensor such as discussed in connection with sensor 120 (FIG. 1). For example, the sensor may have a drive winding and at least one sense element as illustrated by eddy current array sensor 700 in FIG. 7A. Sensor 700 includes a connector portion 710, a lead portion 720, and an eddy current array portion 730. A detail of the eddy current array portion 730 is shown in FIG. 7B. Sensor 700 has a drive winding 731 with a linear portion, seven sensing elements 732, and dummy elements 733 flanking the sensing elements. Sensing elements 732 and the drive winding 731 have leads in lead portion 720 that connect to the connector portion 710 so that sensor 700 may be excited and measured by suitable instrumentation. It should be appreciated that the design of sensor 700 is merely an example, and that different sensor types and sensor geometries may be used in accordance with the needs of the specific application.

At step 603 the sensor is scanned across the test object while measuring the response of the sensor. Scanning may be performed by hand, or be automated or semi-automated by the use of various forms of automation. The position of the sensor for each measurement may be recorded using any suitable position encoder, for example, any position encoder 103 described in connection with FIG. 1 may be used. The sensor may be measured, for example, using suitable instrumentation such as instrument 110 described in connection with FIG. 1. Measurement may include providing an excitation signal to the drive winding of the sensor and measuring a response signal at each of the one sense elements. In some embodiments, an immittance-type measurement is taken such as the transimpedance between each sense element and the drive winding. More specifically, transimpedance may be defined as the ratio of the induced voltage measured on a sense element to a drive current measured at the drive winding. In some cases measurements are obtained from each sensing element at multiple frequencies.

In some embodiments additional processing of the "raw" sensor measurements may be performed to put the measurements in a preferred form. For example, the raw sensor measurements may be used to estimate the electrical conductivity at each sensor position during the scan. This may be done using a multivariate inverse method and a precomputed database of sensor responses, though any suitable method may be used.

At step 604, the measurements are correlated with one or more signatures in the signature library to determine if a pit is present in the scan data. Details of this process are described in detail in connection with FIG. 9, described in Section IV. The detection process can estimate the location of detected pits based on the sense element position and scan position.

At step 605, the size of detected pits may be estimated. Pit size may be characterized as by a depth, diameter, volume, or in any suitable way. Step 605 may be an optional step as in some embodiments, only the identity of the pits may be of interest and step 604 of pit detection may only reliably detect pits of a certain minimum size. The size of detected pits may be estimated by first generating a signature library using samples with drilled flat bottom holes of known depth; second building a correlation table between the filtered response peak value and the pit depth, and finally using the resulting signature library and correlation table to process service part inspection data. In one such embodiment, a sensor with a relatively small drive-to-sense gap is first scanned with the drive to sense gap on the order of 0.01 inches at a frequency where the skin depth is less than the pit diameter. This first scan is used to detect the pit and determine the areal extent (e.g. diameter) of the pit. Then a sensor with a larger drive-to-sense gap is used at a lower frequency, where the combination of the gap and the frequency result in a skin depth at least 80% of the deepest pit that must be sized. The above procedure for pit depth estimation is then used to estimate the pit depth given the pit diameter. In another such embodiment for each scan the liftoff is determined and the conductivity in the neighborhood of the pit, and both are used to select the proper signature from the signature library both for pit detection and depth sizing. For example, in a multi-frequency measurement a higher frequency response may be used to estimate the pit diameter by measuring the width of the response in the scan direction for the filtered response using a sensor with a relatively small drive-to-sense gap on the order of 0.01 inches with sensing elements on the order of 0.04 inches. Similarly, a lower frequency response may be used to estimate the pit depth by following the procedure described above with a signature library generated from either drilled holes of known diameter and depth, or from destructive testing on actual pits from service, after scanning with the sensor. Once the signature library is generated a correlation table is built relating the peak filtered response to the depth of the pit for a given diameter.

At step 606 a decision is made as to whether there are additional scans to be analyzed. Whether there are additional scans to analyze may be determined from user input or in other suitable ways. In some embodiments, scanning of a test object must be performed in multiple passes due to a limited sensor footprint. For example, in the case of a hole inspected incrementally in the axial direction, a determination may be made if the bottom of the hole has been reached by observing a very large liftoff on the deepest channels.

In some embodiments, a full or partial repeat scan may be made based on the detection and/or sizing results obtained in the initial pass in order to more accurately or confidently characterize the pit. The repeat scan may be performed with higher data density (e.g., by scanning more slowly), shifted to "center" the sensor over the pit, shifted to provide a different relative position of the sensing element(s) over the pit, or with the sensor at a different orientation. For example, the drive winding may be oriented at a different angle relative to the scan direction, and the signature library includes signatures in both drive winding orientations for pits and for EDM notches enabling differentiation between pits and pits with EDM notches. Additionally, or alternatively the signature library may include signatures in two drive orientations for pits clusters enabling determination of the depth and location of the deepest pit in a cluster of pits.

If so, method 600 returns to step 602 and steps 602-606 are repeated until at step 606 it is determined that no further scans require analysis.

At step 607 a suitable output is provided. For example, the results may be used to generate a report that presents the pit locations and sizes in a suitable format.

Method 600 is suitable for various types of test objects and applications such as bolt hole inspection in aircraft or engine structures and components, piping and pipelines both with and without crack colonies, pit clusters and isolated pits, engine blades, flat and curved parts.

As yet another example application, the test object may include a painted joint and the sensor may be placed on the paint such that the liftoff provides an estimate of paint thickness.

As yet another example application, the test object may have a hole (e.g., a bolt hole) and the sensor is installed on a rigid mandrel inserted into the hole. Method 600 may be used to detect pits and estimate a pit size. Also, the geometry of the hole may be estimated such as the diameter of the hole by using a solid mandrel and an MWM-Array that is scanned circumferentially or plunged axially into the hole to map the geometry using multiple sensing elements recorded simultaneously and focusing on the liftoff value to obtain the geometry of the hole. In one such embodiment the tilt of the hole (vertical misalignment) is determined from the edge channel as it is scanned using a rigid mandrel held at a vertical alignment. The amplitude of the sinusoidal response around the circumference for estimated conductivity for the sensing element at the edge of the top of the hole can then be correlated with the angle of misalignment vertically. In another embodiment, out of roundness is measured by mapping the entire internal surface of the hole using liftoff relative to a rigid mandrel held rigidly relative to the top surface.

Figure 8:
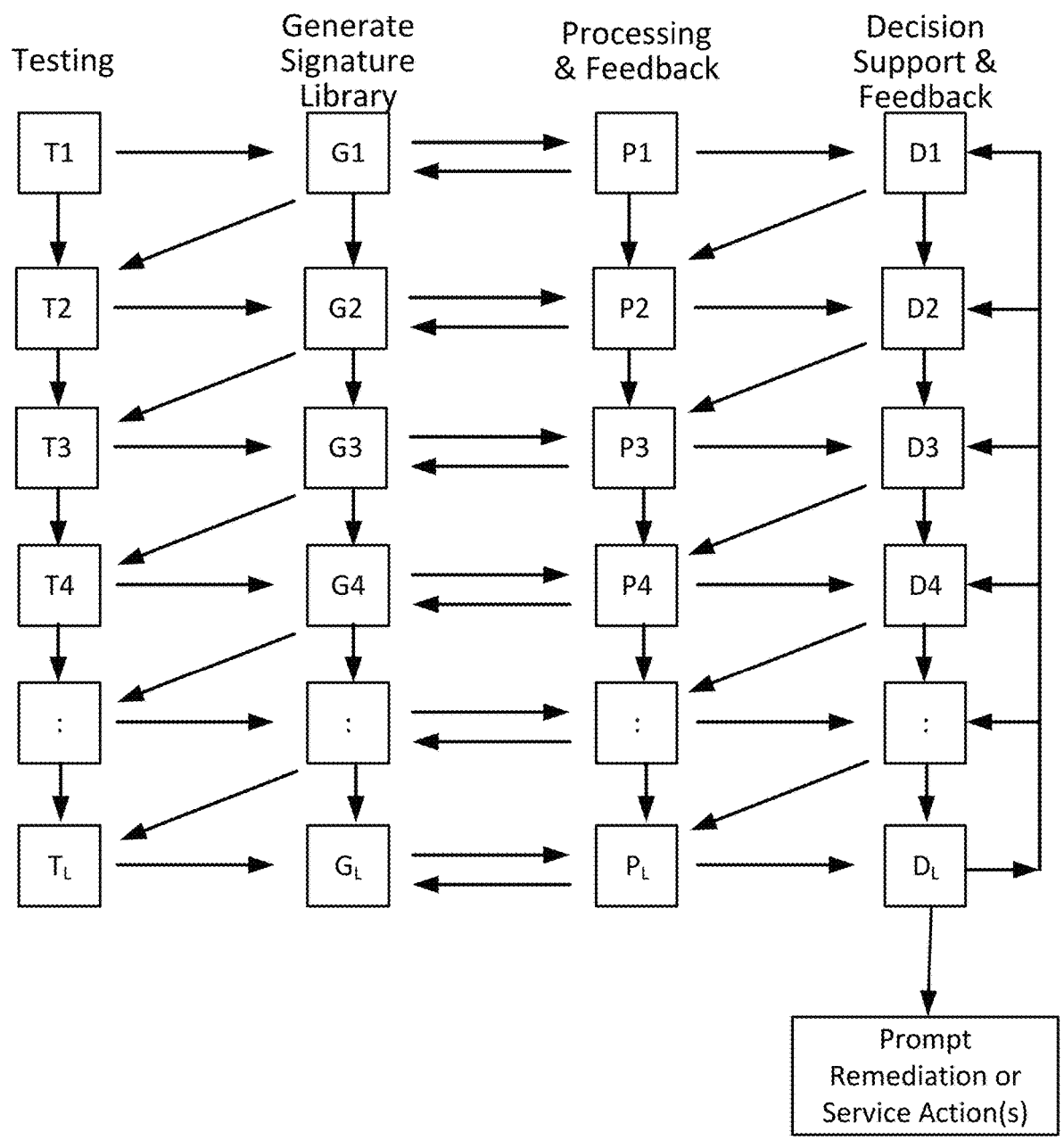
FIG. 8 is a process flow diagram according to some embodiments.

FIG. 8 illustrates conceptually how a process may flow. The process include four sets of actions that can be categorized as (1) testing, (2) generation of signature libraries, (3) processing feedback, and (4) decision support and feedback. Each step labeled such as T1 corresponds to an action either by the operator to record data through nondestructive testing, or G a step of generating signatures for the signature library from the sensor data from the testing, or P processing data from a training test sample, or a test set sample for performance evaluation or from a production part of an in service part, and D making a decision based on the filtered sensor data processed using the signature library. Each of these is a series of steps with data flowing between the types of actions to inform the next steps and parallel steps in the algorithms, data acquisition, processing and decision support as well as to continue to evolve and train the signature libraries. The signatures are used as matched filters to filter the sensor data to both enhance pit like defects and to suppress inconsequential signal content from inconsequential features such as shallow scratches, edges, and geometric features. Further discussion of the use of signature libraries can be found in U.S. Patent Pub. No. 2021/0055262, published Feb. 25, 2021, U.S. nonprovisional patent application Ser. No. 17/660,976 filed Apr. 27, 2022, and U.S. nonprovisional patent application Ser. No. 17/660,979 filed Apr. 27, 2022, which are incorporated herein by reference in their entirety.

Section IV—Signature Library Correlation

Figure 9:
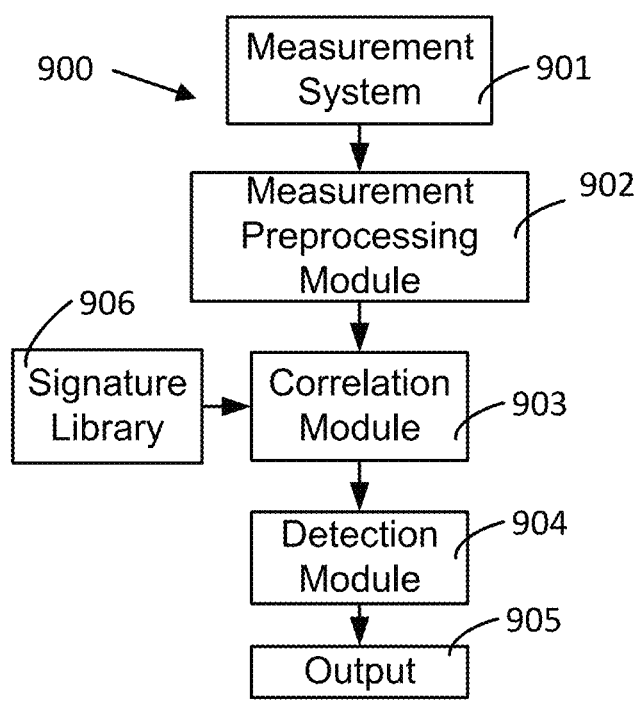
FIG. 9 is a flow diagram for a method of processing sensor measurements, according to some embodiments.

Turning to FIG. 9 a flow diagram 900 for processing sensor measurements is shown. Such flow may be used, for example, to better identify defects detected by a sensor array, though the flow could also be used to process data from a single channel sensor operated in, for example, a raster scan mode. At a high level the processing implemented by flow diagram 900 corrects for variation in the sensor response signal due to the relative position of the sensing elements of the array (or raster path of a sensor) and a defect. It may also assist in correcting for variation in liftoff.

Flow diagram 900 may be implemented, for example, as a method or as a system. In one embodiment, system 100 (FIG. 1) is used with box 901 implemented by impedance analyzer 117, sensor 120, and various related components of system 100; boxes 902, 903, and 904 implemented as part of modules 109; box 905 implemented as part of user interface 113; and signature library 906 stored in memory 115 of system 100. However, it should be appreciated that flow diagram 900 may be implemented in any suitable way.

Flow diagram 900 is now described in detail with reference to an eddy current array sensor. Those of skill in the art will appreciate that the processing can also be applied to data collected by a rastered sensor, dielectrometry sensors and sensor arrays, and other suitable sensors.

The processing utilizes a signature library 906 containing signatures that are correlated with measurements from sensor 120 to enhance detection of defects having the characteristic shapes provided in signature library 906. In some embodiments signature library 906 contains multi-channel responses of an array sensor to a defect of interest. The defect of interest may be a defect of known properties on an available test object 130. For example, the defect of interest may be a crack of a certain length and depth.

The signatures in signature library 906 may be generated using actual sensor measurements from a defect, from analytical or numerical methods simulating a defect response, or in any suitable way. For example, signatures can be generated using measurements from sensor 120 on a specimen having a defect of interest. In this example embodiment sensor 120 is a sensor array scanned over the defect of interest and the response is recorded on multiple channels. After scanning the defect the position of the sensor transverse to the scan direction is incremented and the scan is repeated. The transverse increment may be smaller than the channel spacing so that the response of the sensor array to the defect at different transverse positions can be captured. Motion control equipment may be used to control the relative position of the sensor and defect specimen. As in this example, the test object with the defect used for producing signatures may have a simplified geometry as compared to the test object(s) that will be measured for the application and actual inspection.

In addition to creating signatures for different transverse positions, signatures may be included in the library for multiple nominal liftoffs. This can be achieved, for example by inserting a shim between the sensor and the test object.

Signature measurements may also be collected at multiple frequencies.

In some embodiments, the test object has more than one material layer and the first material layer adjacent or proximate to the sensor, such as the outer skin on an aircraft, may or may not also have a paint layer. In some embodiments, the sensor responds to a primary feature such as a pit on the outermost conducting surface in the presence of a secondary feature such as an edge. The presence of the secondary feature can be included in the signature library. For example, the secondary feature may be an edge response. That is, the pit may be positioned close to an edge such that the sensor response is affected by both the pit and the material edge. A signature library may be built, for example, for a pit and edge with varying sensor positions (e.g., sensor orientation, sensor lateral shift) and varying pit to edge configurations. (Of course, all other variables may also be taken into consideration in building such a signature library.) An edge is simply an example of a secondary feature and the same techniques may be applied to other secondary features such as holes, fasteners, and the like.

Pits having cracks within the pit may be a concern for some test object applications. The signature library may include signatures for pits of various depths with cracks or simulated cracks. Cracks may be simulated, for example, by an EDM notch. Various EDM notch sizes may be used to generate signatures to assist in differentiating between pits with cracks and pits without cracks.

It is noted that the relative position of the channels for the signatures is important but the side to side order may not be. That is a two channel crack signature consisting of channel A and channel B may be used to process two channel data with channel A of the signature correlating with channel 0 of the measurement data and channel B with channel 1 of the measurement data, or with channel A of the signature correlating with channel 1 of the measurement data and channel B with channel 0 of the measurement data. Though in some embodiments there may be asymmetries that reduce the utility of simply switching the order of signature channels. For the purposes of the mathematical notation below channel order is fixed and each is considered a unique signature. Those of skill in the art will readily appreciate that this is done without loss of generality.

Once the measurements for each signature is captured the measurement data may be modified for use in signature library 906. Steps to prepare the signature may include, for example, cropping the measurement data away from the signature, digitally resampling the signature to achieve a desired spacing of the samples, and subtracting the mean value from each datapoint. Though, any suitable preprocessing of the signature for library 906 may be performed. Signature libraries may be prepared for multiple frequencies, different numbers of channels (e.g., 1, 2, 3 . . . ), different sensor orientations, different defects, different liftoffs, and other such parameters that may be desired for a particular application.

Returning now to flow diagram 900 in FIG. 9, attention is drawn to boxes 901 through 905 which represent the process steps and/or modules used to process sensor data using signature library 906 for defect detection. Initially at box 901 a measurement system is used to collect sensor measurements. Measurement system may collect measurements in ways similar to those described in connection with system 100 and FIG. 1. Once measurement data is collected the data may be preprocessed at box 902. The preprocessing may digitally resample the measurement data so that it has the same measurement spacing as the signatures in signature library 906. In some embodiments the preprocessing module subtracts the mean value of each measurement set to be correlated with the signatures of the signature library.

Define N as the integer number of samples in a signature on one channel; define Q as the integer number of channels in the signature; and P as the integer number of signatures in the signature library. Define L as the measurement spacing (unit length). This implies the physical length of the signature is N×L. Let $s_{p,q,i}$ be the value of the pth signature (p from 0 to P−1) in the signature library on the qth channel (q from 0 to Q−1) at the ith index location (i from 0 to N−1). Further, define M (M≥N) as (post resampling for spacing) the integer number of samples per channel in the measurement data to be analyzed and define K as the integer number of measurement channels. Let $m_{k,j}$ be the measurement value of the kth channel (k from 0 to K−1) at the jth index location (j from 0 to M−1). This allows for a total of P×(M−N+1)×(K−Q+1) correlations to be performed.

At box 903 a correlation module determines a correlation value for each measurement set. The correlation may be similar or identical to a cross-correlation of the measurement with the defect signature. The correlation may be calculated in any suitable way. In the simple example where Q=1 the correlation may be calculated as shown in Formula 1.

$$(s_{p,0} \cdot m_{k,j})/(s_{p,0})^2 \quad (1)$$

where "·" is the dot product, $s_{p,0}=[s_{p,0,0}, \ldots, s_{p,0,N-1}]$ and $m_{k,j}=[m_{k,j}, \ldots, m_{k,j+N-1}]$, for j from 0 to M−N, k from 0 to K−1, and p from 0 to P−1. In some embodiments each measurement set, $m_{k,j}$, may be preprocessed to remove the mean value of the set from each sample in the set. Notably if $s_{p,0}=m_{k,j}$ the result is 1. The produces P correlation values for each measurement set $m_{k,j}$. In some embodiments only the largest correlation value for each measurement set is of interest and used in subsequent processing steps; though the correlation values may be stored and processed in any suitable way. It should be appreciated that this correlation function is illustrative and other correlation functions may be used.

When the number of channels, Q, in each signature is greater than one the correlation may be calculated as shown in Formula 2.

$$\sum_{q=0}^{Q-1}(s_{p,q} \cdot m_{k+q,j})/\sum_{q=0}^{Q-1}(s_{p,q})^2 \quad (2)$$

where j from 0 to M−N, k from 0 to K−Q, and p from 0 to P−1. In some embodiments the preprocessing step of removing the mean is performed channel-by-channel for both the signature and the measurement set. If $s_{p,q}=m_{k+q,j}$ for all q=0 to Q−1 the result is 1.

In some embodiments only a subset of signatures from the signature library are correlated at box 903. Any suitable method may be used to determine the number of signatures to be correlated and the selection of signatures for correlation. For example, the signature library may include pit signatures at multiple liftoffs; the signature library may be down selected based on a liftoff estimate near the area being analyzed for a possible pit. (Liftoff may be estimated from sensor measurements in any suitable way, such as using a multivariate inverse method as discussed in connection with modules 109 (FIG. 1)).

In some embodiments a detection module at box 904 is used to flag defects. In some embodiments the detection module uses a simple threshold of the correlation value to flag the presence of a defect. In some embodiments multiple thresholds are used with each incremental threshold indicating a defect of a greater severity. For the example of pits, the threshold may be correlated with pits having a certain depth. It should be appreciated that other detection criteria may be used to provide a robust defect detection system.

Finally at box 905 the results are output in a suitable way. The results may be output, for example, to a user interface device such as a display or recorded to a memory. In some embodiments a report is automatically generated to report detections based on exceeding a certain threshold. For example, a report may be generated to only report pits likely to have a certain pit depth or greater. In some embodiments the results are output as B-scan or C-scan images.

Section V—Shape Filtering

As discussed earlier in Section III, shape filtering may be applied to improve detectability of defects in holes or other test objects more generally. A shape filter module is described that may be used to enhance sensitivity to a primary feature and/or to reduce the response to a secondary feature. In this context a "primary feature" is a feature that is the target of the inspection. A primary feature may be a material defect such as a crack, a material gap indicative of corrosion, or any other feature which an inspection is designed to detect. A "secondary feature" may be described as a benign feature that has a characteristic sensor response. For a bolt hole inspection a secondary feature may be, for example, a scratch, the presence of debris between layers, response to a layer edge, dings at a corner, a burr or other debris from cleaning the hole, out of roundness effects or other surface or geometric features. For corrosion imaging in a joint a secondary feature could be, for example, a fastener response, the response of a groove between materials in a layer, or a response of a material edge. Reducing the response of a secondary feature, that is inconsequential, may allow a primary feature to be more readily detected or accurately sized. A shape filter module may, for example, be implemented in any of the ways described in connection with modules 109 (FIG. 1).

For both primary and secondary features, a goal of the shape filter is to locate responses within the scan data that are similar to characteristic shape responses from a stored library of responses. This stored library of responses can be described as a signature library. The signature library can be used to reveal and enhance the primary (e.g., flaw) response within inspection data that includes noise or other error sources or responses from secondary features. The sensor responses to a geometric feature vary with the properties of the feature. For example, in the case of a crack the sensor response may vary with crack length and depth (and similarly for an EDM notch which may be used to simulate a crack). Similarly, in the case of a secondary feature, the sensor response varies with material type and dimensions of the secondary feature (e.g., the sensor response varies with the diameter of a fastener head for corrosion imaging, or the thickness of a layer or a scratch for a bolt hole inspection). The sensor responses can also vary with the sensor position relative to the feature. As a result, the shape filter module may use signature responses that span a range of properties that capture the variability of the feature response so that its response can be enhanced for detection or reduced for anomaly suppression, as appropriate. In some embodiments, a material property or dimension may be estimated and used to select the appropriate signature from the library. This property or dimension might be, for example, the conductivity of a layer, the distance from an edge, the thickness of a layer, or the position of the defect response between adjacent channels in a sensor array. A convenient method for applying this filter is to determine which signature within the library is the best match for each of the features of interest and for each of the channels within the sensor array. The best-match signature is then used to highlight the feature in the filtered data for feature enhancement or used to remove the feature response for secondary feature (anomaly) suppression.

Figure 10:
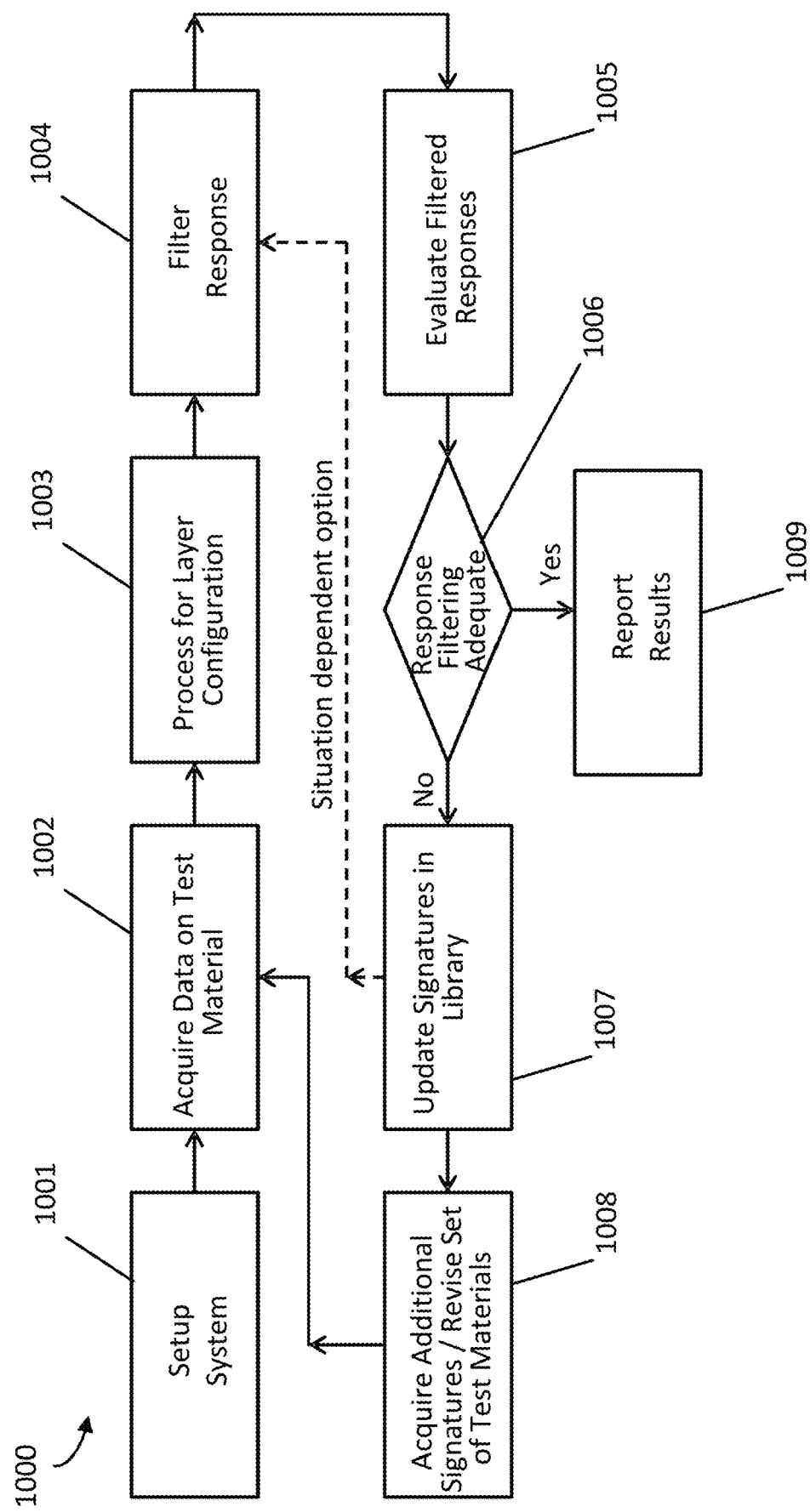
FIG. 10 is a flow diagram for a method of generating a library of signature responses according to some embodiments.

FIG. 10 provides a method 1000 for building a signature library according to some embodiments. A goal of method 1000 is to have a small number of signatures which enables faster processing for the filtering algorithm while still detecting and performing appropriate analysis on all features of interest. The steps of method 1000 are detailed and example applications are discussed. Method 1000 may be used for building a signature library for primary features (e.g., for feature detection, such as crack detection in bolt holes) and secondary features (e.g., for anomaly suppression, such as the removal of fastener responses to improve detection and characterization capabilities for corrosion material loss).

At step 1001 method 1000 sets up the inspection system. This involves assembling the components for the system, performing the calibration or standardization to obtain repeatable and reproducible values for known material conditions, and verifying the performance of the system. The inspection system may be an embodiment of system 100 (FIG. 1), though any suitable inspection system may be used. This performance verification can be performed as electrical conductivity or magnetic permeability measurements on reference materials with known properties or on unflawed materials with known nominal properties. Typically this verification confirms that the property value measured with the system is comparable to the value expected for the material. The performance verification may also include variations in the liftoff. Note that the liftoff test is aimed at confirming that the measured property value is essentially independent from the liftoff over the liftoff range of interest for the inspection. Step 1001 may also include loading, or providing access to, a previously obtained library of signature responses.

At step 1002, method 1000 acquires data from a test object. This step may include a verification that the scanned area fully covers the region of interest for the inspection and an initial identification of observable features in the measured scan responses. This could also include the determination of categorization of these features as relevant, such as a crack or material loss, or anomalous (or non-relevant), such as a boundary between two material layers or a fastener, but this is only an initial determination. In some embodiments, step 1002 involves inserting a probe (e.g., sensor cartridge 140, FIG. 1) into a bolt hole and obtaining one or more sets of scan data around the circumference of the hole. This could be done with a single plunge position as the circumferential position is varied, then increasing the axial plunge as needed and repeating the circumferential scans until the entire thickness of the bolt hole is inspected. As another example, step 1002 may involve one or more scans over the skin surface of material having subsurface structural elements, such as a lap joint. After the scan over the structural elements, the fastener pattern and possibly the layout of the subsurface structural elements should be visible. Generally the fastener responses would be considered anomalous compared to the material loss from corrosion that could be in the vicinity of the fasteners.

Step 1003 refers to the application of a processing algorithm to determine the layer configuration. This is done to identify different material types and layer thicknesses within the test material. This could be used to verify the inspection as well, if apriori knowledge of the material stack up for the region of interest is available. For example, for bolt hole inspection a single excitation frequency could be used with the measured responses at different axial positions within the bolt hole to determine the material type and thickness of each of the different layers comprising the test material geometry. Similarly, for a lap joint, one or more frequency measurements could be used to identify the material type and thickness of the layers perpendicular to the inspection surface. In particular, high frequency measurements, where the penetration depth is comparable to or smaller than the thickness of the near surface skin layer of the test material, can be used to identify the type of material, such as an aluminum alloy, for the skin, to determine the presence of the near surface defects such as pits, and to determine regions of nonconductive coating variations, such as paint, that may be of interest. In one such embodiment the thickness of the paint (estimated from the liftoff) or an estimated layer thickness may be used to select the appropriate signatures for defect detection or secondary feature suppression. Similarly, low frequency measurements, where the penetration depth is comparably larger than the thickness of the near surface skin layer of the test material, can be used in combination with the high frequency measurements to determine the thickness of the skin layer and to identify the type of material for the subsurface layers, such as an aluminum alloy or a magnetic steel. This step could also be used to determine the presence of the subsurface defects such a corrosion material loss but it is preferable to perform this evaluation after the anomalous responses have been removed, for the example of corrosion imaging.

At step 1004 method 1000 determines the filter response for the inspection data for a library of signature responses. Subsets of the signature library responses could be used. For example, signature responses appropriate for cracks in titanium alloys or aluminum alloys could be used along with the layer type identification of step 1003 to reduce the number of signatures used as part of the shape filtering approach since the signatures for the incorrect material type may not be inappropriate. In other words (and for example), using crack signatures for a titanium alloy may not be appropriate for an aluminum alloy. For the bolt hole inspection, the filtering process is aimed at improving the response to the defect features. However, for the material loss inspection, the filtering process is aimed at the removal of anomalous responses not associated with the material loss such as the responses from fasteners or material edges. In this case, different signature responses may be required based upon the material type of the subsurface layers, such as a magnetic steel alloy versus an aluminum alloy. Note in one embodiment the signatures may be extracted and placed in the signature library from neighboring fasteners. In one such embodiment, after the detection process is first completed, if the fasteners that are observed by the operator have not been completely removed (suppressed) from the response images, then the operator may extract a response from a apparently similar fastener (based on his visual observations or on the sensor responses) in the neighborhood of the joint area of interest. This would enable improved fastener suppression (or suppression of other such secondary features) by using similar features in the neighborhood or even within the inspection area of interest. In another embodiment, instead of the immediate neighborhood, a signature might be extracted and added to the library for secondary feature suppression, from a similar area on the same aircraft or even from a different aircraft with similar or the same fastener types and joint configurations.

At step 1005 method 1000 evaluates the filtered responses with a goal of determining the adequacy of the filtering process in Step 1004. This evaluation can take a variety of different forms. For defect detection, such as crack detection or material loss detection, this could be a comparison to known defect feature conditions. The comparison could be a hit/miss type of analysis to determine if known defects are missed or a comparison of measured response levels to determine if the response level correlates with the properties of the defect condition, such as crack length, crack depth, or material loss depth. For anomaly suppression, the evaluation of the filtered response in the vicinity of each anomaly can be assessed through the variation of the impedance response and/or a measured property response (such as material layer conductivity or thickness). This evaluation could simply determine if the response variation is within a threshold level of the baseline value. For example, the electrical conductivity typically varies by several % IACS in the vicinity of typical fasteners within joined aluminum alloy panels having a nominal electrical conductivity of 32% IACS. The threshold could be that the electrical conductivity difference between the fastener response and the panel response must be less than 0.5% IACS. If the anomaly response exceeds the threshold then this response can be a candidate for a signature to be added to the library of signature responses.

Step 1006 provides a decision opportunity based upon the adequacy of the filtering process. As with Step 1005, this decision can take a variety of different forms. For defect detection such as a bolt hole inspection, this could include an assessment of the probability of detection, the false call rate, and generation of a receiver operator curve (i.e., POD vs False call rate), or another form of reliability and repeatability statistical analysis to independently assess feature detection and suppression performance. For anomaly suppression, this assessment is primarily aimed at determining if the features of interest, such as material loss from corrosion or a crack in a bolt hole, can be detected even if the anomalies are not fully or completely suppressed. For example, if a gap between the joint skin layers leads to an anomaly response that is not suppressed, this may not affect the detectability of the material loss if the areal extent of the material loss of interest is much larger than a dimension of the gap response. However, if any of the known anomaly responses, such as fastener responses, exceed a threshold response, then the anomaly suppression may not be adequate. If the performance level is satisfactory, then the procedure can proceed to Step 1009 and the results of the measurement or the inspection can be reported. In either case, if the performance level is not satisfactory, then the signature library should be updated as in Step 1007.

Step 1007 refers to actions performed to update the signature library and to improve performance for the measurement or inspection. In either case, for defect detection or anomaly suppression, it may be desirable to remove signature responses from the library in order to reduce processing time with the shape filter. The signatures to be removed may be inappropriate for the inspection, such as the fastener type or size may not be relevant to a particular inspection or the signatures may be similar to other signatures in the library, or the signatures may correspond to feature dimensions that are not of interest, such as 0.010 in. long cracks when only cracks that are longer than or equal to 0.020 in. are of interest. Also for both defect detection and anomaly suppression, the response from a feature of interest can be captured and added to the library of signature responses. This could be from data that was acquired as part of Step 1002 and could be for a crack that was missed as part of the inspection or for a fastener that had a response which was not suppressed. In the case of bolt hole inspection, signatures might be acquired from representative samples with representative features that must be not only suppressed but also identified. Features in bolt holes such as scratches, debris, shallow pits, burrs, or other surface and geometric anomalies might need to be both suppressed and identified. In some cases the identification of an anomaly such as a burr or debris, might result in adjustment of the primary feature detection threshold to avoid a false call. In another such embodiment the signature of the inconsequential anomaly (e.g., a burr) might be used to suppress the associated response, without removing the response of a primary feature that might occur in the vicinity. In one embodiment, the identification of the inconsequential feature, may prompt the operator to view the responses and make a judgment on whether the response is due to an inconsequential feature or a primary feature that must be detected, or to simply determine that the hole is uninspectable or needs to be cleaned further before proper inspection. The process of building the signature library can be repeated for additional features. Once the signature library is updated the next step depends upon the situation. For anomaly suppression the data has already been acquired and the next step would be to proceed to Step 1004. If desired, Step 1002 could be repeated as well but it is not necessary. For defect detection, the next step is Step 1008.

Step 1008 refers to the acquisition of additional signature responses and updating the set of materials in the test set. This primarily applies to the generation of the signature library for defect detection since the evaluation of the signature library through a performance study such as a probability of detection study should not incorporate measurements that were used for both creating the signature library and for assessing the system performance. This may require obtaining additional measurements on similar samples, possibly on electrical discharge machined (EDM) notches instead of real cracks and possibly on similar alloy materials. For each feature and variation of interest, such as several scans where the axial position is changed so that the feature position relevant to the sense element in an array is varied, the signature response is added to the library. The filtered response (Step 1004) is repeated to verify that the desired feature response is enhanced by the updated library. Any of the material samples used to generate signatures that were placed into the library of signature responses is considered part of a training set and is not part of the evaluation set. However, in cases where sufficient sample sets are not available, a subject matter expert may choose to keep the sample used to generate the signature library within the set and retake the data to make it as independent as practical. Consequently, this set of test materials, or the evaluation, may be updated and the data acquisition step (Step 1002) should be repeated.

This process allows the signature library to be generated or updated as needed depending upon the inspection application. An initial signature library is not required for this process. Note that a signature library might be generated in advance, or during an inspection or both. The decision to modify a signature library must be made in the context of historical, present and future performance. Note that if the data from the inspection method is digital and archivable, then a smaller signature library might be used during the performance of inspections to provide an initial result to the operator, and later a larger signature library might be used to process the data again. Careful records of the signature library contents used for each inspection and later analysis is needed to properly compare results and support decisions regarding fitness for service. Comparisons within a single part, for multiple parts or across fleets must ensure that the same signature libraries are used and the same inspection settings. This should be verified if practical on a standard. Having data on a standard, even if it is not used for calibration, is helpful to verify consistency across inspections.

It should be appreciated that while anomaly suppression was discussed above in connection with corrosion detection, it may also be used to enhance detection of defects in bolt holes. For example, if a hole is cleaned and the cleaning produces a burr at an edge, the presence of the burr might produce a response that results in a false call or makes the hole uninspectable for conventional eddy current methods. One solution is to extract signatures of typical burrs and other such features that require identification and/or suppression, including debris, scratches, dinged edges, out of roundness, pits. Identification requires use of a range of signatures in a signature library that are used to process the inspection data to find a best match to the secondary feature. In one such embodiment, if the secondary feature is identified (e.g., a burr at an edge) then a confidence level might be reported regarding its identification and the likelihood that it is a burr and not a crack. This likelihood could be derived from the quality of the match to a library of burr responses as well as the match to a crack response to enable differentiation between burrs and cracks. In one such embodiment the response from the secondary feature may be above a predetermined threshold that is established by locating EDM notches near known burrs in a training set of samples. In this embodiment, the threshold is determined above which the EDM notch response is statistically distinguishable from the burr (or other secondary anomaly) response. If the secondary anomaly response is above the threshold, then an action might be prompted. Such actions might include, cleaning a bolt hole to remove the burr, extracting a new signature from a more representative sample to add to the suppression or detection library, or prompting the operator to view the responses of multiple channels to make a recommendation based on experience, or visual observations.

In the case of scratch detection and location within a bolt hole, the liftoff signatures from representative scratches may be used to identify a scratch and estimate depth of the scratch. If the scratch is shallow, the software may allow the inspection for cracks to proceed. If the scratch is deeper than a predetermined depth the inspection for cracks may be halted or a measure of hole quality may require a maintenance action on the hole to improve the quality.

In one embodiment there are multiple primary (damage or quality) features that may require enhancement using a signature library and multiple secondary features (inconsequential features that only obscure the primary features). In one such embodiment, a subset of primary and secondary features are processed using associated signature libraries to enhance the primary responses and suppress the secondary responses. In one such embodiment, for features that are not processed (often called filtered) with a signature library, a multivariate inverse method is used to estimate a property where the spatial or temporal response of the property is perturbed by the presence of the feature of interest and is apparent beyond a detection threshold without the need for a signature library. In one such example, the feature is the location of an edge of a layer in a bolt hole for a secondary feature, or debris between layers or a burr resulting from cleaning of the hole. In another such example the primary feature is the thinning of a metal layer in a joint caused by corrosion that must be distinguished from a fastener response.

An eddy current array sensor such as sensor 700 (FIGS. 7A-7B) may have a functional symmetry such that essentially identical responses are obtained regardless of whether a defect is at a top edge or a bottom edge of a layer. Accordingly, a signature library may not require different signatures based on whether the inspection data is proximal to a top edge or a bottom edge. In some embodiments one row of sensing elements is located in the center of a single rectangular drive and the sensor is scanned in the circumferential direction and then incremented in the axial direction to build an image of the entire internal surface of a bolt hole. The response to EDM notches (or other defects) of the same size produces substantially the same signature shape when the leading drive conductor passes over the EDM notch for the top edge for the nearest sensing element when compared to the response of the nearest sensing element for a bottom edge EDM notch when the trailing drive conductor crosses the EDM notch. The introduction of such symmetry may be used to reduce the number of signatures needed in the signature library which in turn may reduce the needed processing time. Note that this same approach could apply to an edge, such as the edge of a bulkhead that is relatively thin where the sensor is at 45 degrees and is scanned in a direction parallel to the top edge.

In one embodiment a method is described that includes several types of actions including: (T) testing, (G) generation signature libraries, (P) processing with feedback, and (D) decision support and feedback. Where each step labeled such as T1 corresponds to an action either by the operator to record data through nondestructive testing, or G a step of generating signatures for the signature library from the sensor data from the testing, or P processing data from a training test sample, or a test set sample for performance evaluation or from a production part of an in service part, and D making a decision based on the filtered sensor data processed using the signature library.

Testing typically begins with testing on a training set of samples to build the signature library. For pits, this testing includes real pit samples from service or from accelerated corrosion testing to generate pits, or flat bottom holes drilled with small drills (e.g., 0.25 mm diameter) to produce pit like samples. These start with simple samples with a single pit each including samples with varied diameter and depth pits.

Then this expands to include pit clusters of two, three or four pits to enable signature generation for deep pits in proximity to other more shallow pits or deep pits to enable correction for the presence of other pits. Pit sizing is performed by using the signature that best matches an isolated pit or a pit in a pit cluster. Then the filtered response is correlated with actual pit depths using the training samples. Then for testing on in service parts the filtered data is used to estimate the pit depth. Then if a remediation action like grinding is performed, the sample is tested again as material is removed (e.g., T3, T4, T5 . . . ) at each increment of removal and when the pit is fully removed the actual depth is determined and used to further train the signature library. When processing first a subset of signatures is used for detection and determination of the surface extent for or areal extent of the pit or the layout of the pit cluster. Then if the estimated deepest pit is more than a predetermined threshold, ther scans are performed with lower frequencies and or a larger drive-to-sense gap to better estimate the depth of the deepest crack. Then as material is removed, e.g. through grinding the data is recorded again and processed again and the decisions are made to retire the part if the pit depth is too deep or continue with the removal of material.

Section VII—Closing Discussion

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appeared in this specification are deemed modified by a term of degree thereby reflecting their intrinsic uncertainty. The "substantially simultaneous response" means responses measured within 1 second of one another.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for detecting and sizing a pit in a test object, the method comprising acts of:
   (i) storing a signature library including signatures for multiple pit depths and multiple pit diameters in a non-transient computer-readable storage medium;
   (ii) placing a sensor having a drive conductor and a plurality of sense elements proximate to the test object;
   (iii) scanning the sensor across the test object;
   (iv) during the scanning operating an immittance instrument to excite the drive conductor at a high frequency and a low frequency, and obtain sensor data by measuring the plurality of sense elements; and
   (v) operating a processor to
      (1) detect a pit by determining a calculated value exceeds a threshold,
      the calculated value being a correlation between a first signature from the signature library and a high frequency response from the sensor data;
      (2) estimate a pit diameter using the high frequency response; and
      (3) estimate a pit depth from a low frequency response from the sensor data and a second signature from the signature library associated with the estimated pit diameter.

2. The method of claim 1, wherein in addition to pit diameter and pit depth a third feature is varied in the signature library.

3. The method of claim 2, wherein the third feature is an edge response.

4. The method of claim 1, wherein the scanning is in a hole of the test object and the threshold is determined for a target pit depth and holes with pits deeper than the target pit depth are indicated in a report.

5. The method of claim 4, wherein signatures are included in the signature library for pits of various depth with EDM notches at a prescribed size to enable distinguishing between pits with cracks and pits without cracks.

6. The method of claim 1, wherein
the sensor has a drive-to-sense gap of less than 0.02 inches and a sensing element pitch of less than 0.05 inches, and
the high frequency is selected such that for the test object, skin depth is less than a minimum pit diameter of interest.

7. The method of claim 6, wherein a first scan at the high frequency is used to estimate the diameter of the pit and a second scan is performed with a larger drive-to-sense gap at the low frequency to estimate the depth of the pit, and
the signature library is generated at least in part from a training set of pits with varied depth.

8. The method of claim 1, wherein signatures are stored in the signature libraries for multiple liftoffs, wherein the proper signature is selected based on a model based estimation of the liftoff near a suspected pit response.

9. The method of claim 8, wherein the inspection is performed through paint at a joint and the liftoff provides an estimate of paint thickness.

10. The method of claim 1, wherein slower scans are taken after a first rapid scan to provide higher data resolution, once a suspect defect is detected.

11. The method of claim 1, wherein a second scan is performed with the drive orientation at a second angle relative to the scan direction, wherein the signature library includes signatures in two drive orientations for pits and for EDM notches enabling differentiation between pits and pits with EDM notches.

12. The method of claim 1, wherein a second scan is performed with the drive orientation at a second angle relative to the scan direction, wherein the signature library includes signatures in two drive orientations for pits clusters enabling determination of the depth and location of the deepest pit in a cluster of pits.

13. The method of claim 1, wherein the response to the pit in the presence of a secondary feature is included in the signature library and the method further comprises operating the processor to subtract a secondary feature signature, after scaling, from the sensor data.

14. The method of claim 13, wherein act (v) further comprises operating the processor to estimate a material property of the test object and modifying the estimate of the material property based on the correlation.

15. A system for enhanced pit detection and sizing, the system comprising:
   a processor;
   a non-transient computer-readable storage medium storing a signature library including signatures for multiple pit depths and multiple pit diameters;
   a sensor having a drive conductor and a plurality of sense elements;
   an immittance instrument having a signal generator electrically connected to the drive conductor of the sensor and sense hardware electrically connected to the plurality of sense elements, the signal generator to output an excitation signal comprising a high frequency and a low frequency; and
   a plurality of modules, each modules having computer code executable by the processors, the modules including
      a detection module that determines if a pit is detected by calculating whether a calculated value exceeds a threshold, the calculated value being a correlation between a first signature from the signature library and a high frequency response from the sensor data;
      a pit diameter estimating module that estimates a pit diameter using the high frequency response; and
      a pit depth estimating module that estimates a pit depth from a low frequency response from the sensor data and a second signature from the signature library associated with the estimated pit diameter.

16. The system of claim 15, wherein the sensor is a segmented field sensor.

17. The system of claim 15, wherein the sensor has a drive-to-sense gap of less than 0.02 inches and a sensing element pitch of less than 0.05 inches.

18. The system of claim 15, wherein the threshold is determined for a target pit depth, the plurality of modules further including a reporting module to report all pits having an estimated pit depth in excess of the target pit depth.

19. The system of claim 15, wherein in addition to pit diameter and pit depth, edge position is varied in the signature library.

20. A method for detecting and sizing a pit in a test object, the method comprising:
   storing a signature library including signatures for multiple pit depths and multiple pit diameters in a non-transient computer-readable storage medium;
   placing a first sensor proximate to the test object, the first sensor having a drive winding, a plurality of sense elements, and a first drive-to-sense gap;
   first scanning the first sensor across the test object;
   during the first scanning operating an immittance instrument to excite the drive conductor and obtain first sensor data by measuring the plurality of sense elements; and
   operating a processor (i) to detect a pit by determining a calculated value exceeds a threshold, the calculated value being a correlation between a first signature from the signature library and the first sensor data, and (ii) estimate a pit diameter using the first sensor data;
   placing a second sensor having a second drive-to-sense gap proximate to the test object, the second drive-to-sense gap larger than the first drive-to-sense gap of the first sensor;
   second scanning the second sensor across the test object;
   during the second scanning operating the immittance instrument to obtain second sensor data from the second sensor; and
   operating the processor to estimate a pit depth using the second sensor data and a second signature from the signature library associated with the estimated pit diameter.

* * * * *